(12) United States Patent
Kuwabara et al.

(10) Patent No.: US 8,511,812 B2
(45) Date of Patent: Aug. 20, 2013

(54) AQUEOUS INK COMPOSITION AND IMAGE FORMING METHOD

(75) Inventors: Tomoko Kuwabara, Kanagawa (JP); Yasufumi Ooishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 402 days.

(21) Appl. No.: 12/910,885

(22) Filed: Oct. 25, 2010

(65) Prior Publication Data

US 2011/0109708 A1    May 12, 2011

(30) Foreign Application Priority Data

Nov. 9, 2009    (JP) ................................. 2009-256457

(51) Int. Cl.
*B41J 2/01* (2006.01)

(52) U.S. Cl.
USPC .............................. 347/100; 347/95; 347/102

(58) Field of Classification Search
USPC .............. 347/100, 95, 96, 101, 102, 88, 99, 347/20, 22; 106/31.6, 31.27, 31.13; 523/160, 523/161
See application file for complete search history.

(56) References Cited

U.S. PATENT DOCUMENTS

| 2005/0146544 A1* | 7/2005 | Kondo | 347/7 |
| 2007/0216743 A1* | 9/2007 | Makuta et al. | 347/100 |
| 2009/0088521 A1* | 4/2009 | Hosokawa et al. | 524/558 |
| 2009/0202724 A1* | 8/2009 | Arai et al. | 106/31.86 |
| 2009/0203833 A1* | 8/2009 | Sasada et al. | 524/558 |
| 2010/0076148 A1* | 3/2010 | Shibata et al. | 524/548 |

FOREIGN PATENT DOCUMENTS

| EP | 1882585 A1 | 1/2008 |
| EP | 2058375 A2 | 5/2009 |
| EP | 2075293 A1 | 7/2009 |
| JP | 2008-247940 A | 10/2008 |
| JP | 2009-84494 A | 4/2009 |
| WO | 2007/006638 A2 | 1/2007 |
| WO | 2008/123601 A2 | 10/2008 |

\* cited by examiner

*Primary Examiner* — Manish S Shah
(74) *Attorney, Agent, or Firm* — SOLARIS Intellectual Property Group, PLLC

(57) ABSTRACT

The invention provides an aqueous ink composition including (A) a colorant, (B) a polymer including a hydrophobic structural unit represented by Formula (1) below, (C) a polymerization initiator, (D) a polymerizable compound including an ethylenically unsaturated bond, and (E) water. In the Formula (1), $R^1$ represents a hydrogen atom or a methyl group; $R^2$ represents a hydrogen atom, an alkyl group, an alkyloxy group, an acyl group, or a halogen atom; $L^1$ represents a single bond, or a divalent linkage group including at least one selected from the linkage group consisting of an alkylene group having from 1 to 12 carbon atoms, an alkenylene group having from 2 to 12 carbon atoms, an alkyl ether group having from 2 to 6 carbon atoms, —$CONR^3$—, and —COO—; $R^3$ represents a hydrogen atom or an alkyl group having from 1 to 6 carbon atoms; Ar represents a monovalent group derived from a condensed-ring type aromatic compound having 8 or more carbon atoms, a monovalent group derived from a heterocyclic compound in which aromatic rings are condensed, or a monovalent group derived from a compound in which two or more benzene rings are connected.

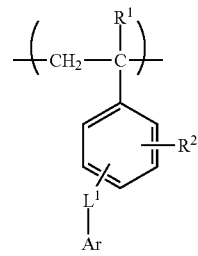

Formula (1)

15 Claims, No Drawings

AQUEOUS INK COMPOSITION AND IMAGE FORMING METHOD

CROSS-REFERENCE TO RELATED APPLICATION

This application claims priority under 35 USC 119 from Japanese patent Application No. 2009-256457 filed on Nov. 9, 2009, the disclosures of which are incorporated by reference herein.

BACKGROUND OF THE INVENTION

1. Field of the Invention

The present invention relates to an aqueous ink composition having curability, and an image forming method of forming an image cured by irradiation of radiation.

2. Description of the Related Art

Recently, an aqueous paint and an aqueous ink has been encouraged based on an increase of demands such as a resource protection, an environmental conservation, and an increase of operation stability.

As the aqueous paint and ink, an ink composition containing water as the main medium and capable of being cured by irradiation of active radiation ray such as ultraviolet rays, that is, an aqueous active radiation curable ink is known. The curable ink can be suitably used for image printing, pre-treatment for providing printability of a recording medium, and post-treatment such as protection and decoration of the printed image. Since the ink composition contains water as the main component, the composition has high safety. Recently, when the aqueous active radiation curable ink has been used in recording using an ink jet method, there is demanded a performance where curing progresses with high sensitivity, and a high quality image can be formed.

However, in the present situation, an aqueous active radiation curable ink which achieves dispersion stability necessary for ink used in an ink jet recording method, and can form a cured film which is excellent in, for example, glossiness, adhesiveness, and water resistance by irradiation of light, has not been provided.

It is known to use various pigment dispersant polymers for increasing performance of the ink used in ink jet recording method. For example, there is disclosed an aqueous ink for ink jet recording using a polymer having a benzene ring which is not directly bonded to the main chain as a pigment dispersant (for example, see Japanese Patent Application Laid-Open (JP-A) No. 2009-84494), in which for example, stability over time or dischargeability is excellent. Moreover, as the aqueous active radiation curable ink, there is disclosed the photo-polymerizable/crosslinkable composition where a benzyl dimethyl ketal type water-soluble photo-initiator is used and styrene/acrylic acid/ethyl acrylate copolymer is used as a dispersant (for example, see JP-A No. 2008-247940), in which curing sensitivity is increased.

However, the conventional aqueous ink for ink jet recording does not contain a compound such as a polymerizable monomer, and an image is not printed by providing a process such as photocuring, and therefore it is hard to say that a printed matter using the ink is sufficient from the viewpoints such as adhesiveness to a recording medium and the water resistance of an image.

Moreover, there is a case where the aforementioned photo-polymerizable/crosslinkable composition has insufficient dispersion stability in the ink, and glossiness of a cured film after photocuring cannot be satisfied.

SUMMARY OF THE INVENTION

The present invention has been made in view of the above circumstances, and provides an aqueous ink composition and an image forming method.

According to a first aspect of the invention, there is provided an aqueous ink composition including (A) a colorant, (B) a polymer including a hydrophobic structural unit (a) represented by Formula (1) below, (C) a polymerization initiator, (D) a polymerizable compound including an ethylenically unsaturated bond, and (E) water.

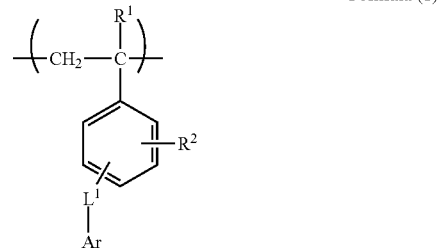

Formula (1)

In the Formula (1), $R^1$ represents a hydrogen atom or a methyl group, $R^2$ represents a hydrogen atom, an alkyl group, an alkyloxy group, an acyl group, a halogen atom. $L^1$ represents a single bond, or a divalent linkage group including at least one selected from the linkage group consisting of an alkylene group having from 1 to 12 carbon atoms, an alkenylene group having from 2 to 12 carbon atoms, an alkyl ether group having from 2 to 6 carbon atoms, —$CONR^3$—, and —COO—. $R^3$ represents a hydrogen atom or an alkyl group having from 1 to 6 carbon atoms. Ar represents a monovalent group derived from a condensed-ring type aromatic compound having 8 or more carbon atoms, a monovalent group derived from a heterocyclic compound in which aromatic rings are condensed, or a monovalent group derived from a compound in which two or more benzene rings are connected.

According to a second aspect of the invention, there is provided an image forming method including providing the aqueous ink composition of the first aspect of the invention on a recording medium by an ink jet method, and irradiating the aqueous ink composition provided on the recording medium with active radiation rays.

DETAILED DESCRIPTION OF THE INVENTION

The aqueous ink composition and the image forming method using the same of the invention will be described below in detail.

<Aqueous Ink Composition>

The aqueous ink composition of the invention includes (A) at least one colorant, (B) at least one polymer having hydrophobic structural unit (a) represented by Formula (1) below, (c) at least one polymerization initiator, (D) at least one polymerizable compound including an ethylenically unsaturated bond, and (E) water. As necessary, the aqueous ink composition of the invention may be formed by using other components.

In the invention, by containing the polymer having the specific hydrophobic structural unit (a) as well as the polymerization initiator and the polymerizable compound, a cured film (for example, image) having excellent glossiness, adhesiveness, and water resistance may be formed when an image is formed by irradiation of radiation rays while achieving dispersion stability and dischargeability necessary for an ink.

Hereinafter, respective components of the aqueous ink composition of the invention (hereinafter, simply also referred to as "ink" or "ink composition") will be described in detail.

(A) Colorant

The aqueous ink composition of the invention contains one or more colorants. The aqueous ink composition of the invention may form not only monochromatic images, but also full color images.

In a case in which a full color image is formed, a magenta color ink, a cyan color ink, and a yellow color ink may be used, and a black color ink may be further used for adjusting color. In addition to the yellow, magenta and cyan color inks, a red ink, a green ink, a blue ink, a white ink, or so-called special color inks (for example, colorless ink) used in the printing field may also be used.

As the colorants, for example, known dyes or pigments may be used without specific limitation. Among them, it is preferred that colorant which is substantially insoluble or sparingly soluble in water is used from the viewpoint of ink colorability. Specifically, examples of the colorants include, for example, various pigments, dispersion dyes, oily dyes, and pigments forming J aggregates. Moreover, pigments are more preferred from the viewpoint of light resistance.

The kinds of pigment are not specifically limited, and may be selected and used from conventionally known organic pigments and inorganic pigments.

Examples of the organic pigment include, for example, an azo pigment, a polycyclic pigment, a dye chelate, a nitro pigment, a nitroso pigment, an aniline black, and the like. Among them, for example, an azo pigment and a polycyclic pigment are more preferred. Examples of the azo pigment include, for example, an azo lake, an insoluble an azo pigment, a condensed azo pigment, a chelate azo pigment, and the like. Examples of the polycyclic pigment include, for example, a phthalocyanine pigment, a perylene pigment, a perinone pigment, an anthraquinone pigment, a quinacridone pigment, a dioxazine pigment, an indigo pigment, a thioindigo pigment, an isoindolinone pigment, a quinophthalone pigment and the like. Examples of the dye chelate include a basic dye chelate, an acidic dye chelate and the like.

Examples of the inorganic pigment include, for example, titanium oxide, iron oxide, calcium carbonate, barium sulfate, aluminum hydroxide, barium yellow, cadmium red, chrome yellow, and carbon black, and the like. Among them, carbon black is particularly preferred.

In addition, examples of carbon black include those produced by conventional methods such as a contact method, a furnace method, and a thermal method.

Specific examples of the pigments include the pigments described in paragraphs [0142] to [0145] of JP-A No. 2007-100071. Among them, from the viewpoint of colorability and color, the pigment used in the yellow color ink is preferably C.I. Pigment Yellow 74 (PY74), the pigment used in the magenta color ink is preferably C.I. Pigment Red 122 (PR122), and the pigment used in the cyan color ink is preferably C.I. Pigment Blue 15:3 (PB15:3). Furthermore, the pigment used in the black color ink is preferably carbon black.

The content of the pigment in the aqueous ink composition may be appropriately set according to the purpose. The content of pigment as a pure pigment component (not containing surface treating agent or dispersant) is preferably in a range from 0.3% by mass to 10% by mass with respect to the total amount of the aqueous ink composition. Furthermore, although the pigment depends on the dispersed state of pigment particles, when the content of the pigment is approximately in a range of 0.3% by mass to 1% by mass, the ink which the pigments are included may be used as a pale ink. Furthermore, when the content of the pigment exceeds the range described above, the ink which the pigments are included is generally used for coloration.

(B) Polymer

The aqueous ink composition of the invention contains one or more polymers having a hydrophobic structural unit (a) represented by Formula (1) below as a polymer. For example, the polymer may be used as a dispersant of the colorant (preferably pigment).

In the invention, by using the polymer containing the specific structural unit as the hydrophobic unit, when the dispersibility of the pigment is increased to form a cured film, glossiness, adhesiveness, and water resistance of the cured film can be increased. Further, for the aqueous ink composition, stability is maintained and storage stability is improved. Furthermore, in a case in which the aqueous ink composition of the invention is applied in an ink jet method, adhesion of the aqueous ink composition to a nozzle is suppressed, and hence dischargeability can be improved.

—Hydrophobic Structural Unit (a)—

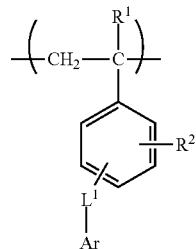

Formula (1)

In the Formula (1), $R^1$ represents a hydrogen atom or a methyl group. Among them, the hydrogen atom is preferred.

$R^2$ represents a hydrogen atom, an alkyl group, an alkyloxy group, an acyl group, and a halogen atom.

The alkyl group is preferably an alkyl group having from 1 to 6 carbon atoms and includes, for example, a methyl group, an ethyl group, a propyl group, an i-propyl group, a butyl group, a t-butyl group, a pentyl group, and a hexyl group. Among them, an alkyl group is preferably an alkyl group having from 1 to 3 carbon atoms, and a methyl group is more preferred.

The alkyloxy group is preferably an alkyloxy group having from 1 to 6 carbon atoms in the alkyl portion and includes, for example, a methoxy group, an ethoxy group, and a propoxy group. Among them, an alkyloxy group having from 1 to 3 carbon atoms in alkyl portion is preferred.

The acyl group is preferably an acyl group having from 1 to 6 carbon atoms and includes, for example, an acetyl group, a propionyl group, a butanoyl group, a pentanoyl group, and a hexanoyl group. Among them, an acyl group is preferably an acyl group having from 1 to 3 carbon atoms.

Examples of the halogen atom include, for example, a chlorine atom, a bromine atom, and an iodine atom.

Among them, $R^2$ is preferably a hydrogen atom, and an alkyl group, more preferably a hydrogen atom, an alkyl group having from 1 to 6 carbon atoms, further preferably a hydrogen atom, an alkyl group having from 1 to 3 carbon atoms, particularly preferably a hydrogen atom, a methyl group, and most preferably a hydrogen atom.

$L^1$ represents a single bond or, a divalent linkage group including at least one selected from the linkage group consisting of an alkylene group having from 1 to 12 carbon atoms, an alkenylene group having from 2 to 12 carbon atoms, an alkyl ether group having from 2 to 6 carbon atoms, —$CONR^3$— ($R^3$ represents a hydrogen atom or an alkyl group having from 1 to 6 carbon atoms), and —COO—.

From the viewpoint of dispersion stability, $L^1$ is preferably a single bond or, a divalent linkage group including at least one selected from the linkage group consisting of an alkylene group having from 1 to 6 carbon atoms, —COO—, and —$CONR^3$— ($R^3$ represents a hydrogen atom, or an alkyl group having from 1 to 6 carbon atoms), and is more preferably a single bond or, a divalent linkage group including at least one selected from the linkage group consisting of an alkylene group having from 1 to 4 carbon atoms, —COO—, and —CONH—.

Ar represents a monovalent group derived from a condensed-ring type aromatic compound having 8 or more carbon atoms, a monovalent group derived from a heterocyclic compound in which aromatic rings are condensed, or a monovalent group derived from a compound in which two or more benzene rings are connected.

The condensed-ring type aromatic compound having 8 or more carbon atoms represents an aromatic compound having 8 or more carbon atoms including an aromatic ring where at least two benzene rings are condensed; and/or at least one aromatic ring and alicyclic hydrocarbon condensed to the aromatic ring. Specific examples include, for example, a naphthalene, an anthracene, a fluorene, a phenanthrene, and an acenaphthene.

The heterocyclic compound where aromatic rings are condensed is a compound where an aromatic compound not containing a hetero atom (preferably a benzene ring) and a cyclic compound having a hetero atom are at least condensed. Herein, the cyclic compound having a hetero atom is preferably a five- or six-membered ring. The hetero atom is preferably a nitrogen atom, an oxygen atom, or a sulfur atom. The cyclic compound having a hetero atom may have plural hetero atoms. In this case, the hetero atom may be the same as or different from each other. Specific examples of the heterocyclic compound where aromatic rings are condensed include, for example, a phthalimide, a naphthalimide, an acridone, a carbazole, a benzoxazole, a benzothiazole, and the like.

The compound where two or more benzene rings are connected refers to a compound where two or more benzene rings are bonded to each other by using a single bond, a divalent linkage group, or a trivalent linkage group. The divalent linkage group is preferably a divalent linkage group selected from the group consisting of an alkylene group having from 1 to 4 carbon atoms, —CO—, —O—, —$CONR^3$— ($R^3$ represents a hydrogen atom or an alkyl group having from 1 to 6 carbon atoms), and combination of at least two of these. Further, example of the trivalent linkage group includes a methine group.

Herein, respective benzene rings may be bonded to each other through plural linkage group, in this case, plural linkage group may be the same or different. The number of the benzene rings is preferably from 2 to 6, and more preferably from 2 to 3.

Specific examples of the compound where two or more benzene rings are connected include, for example, a biphenyl, a triphenyl methane, a diphenyl methane, a diphenyl ether, and a diphenyl sulfone.

From the viewpoints of dispersibility and stability over time of the pigment, the Ar is preferably a monovalent group derived from a naphthalene, a biphenyl, a triphenyl methane, a phthalimide, a naphthalimide, an acridone, a fluorene, an anthracene, a phenanthrene, a diphenyl methane, or a carbazole, and more preferably a monovalent group derived from a carbazole, a naphthalene, a biphenyl, a phthalimide, a naphthalimide, or an acridone.

Herein, for example, a monovalent group derived from a naphthalene means a monovalent group formed by removing one hydrogen atom from naphthalene, and a position where a hydrogen atom is removed is not specifically limited.

Ar may have a substituent. Examples of the substituent include a monovalent substituent such as an alkyl group, an alkyloxy group, an alkyl carbonyl group, an alkyl carbonyloxy group, an alkyloxycarbonyloxy group, a halogen group, a cyano group, and a divalent substituent such as an oxo group. Further, preferable substituents include, for example, an alkyl group having from 1 to 10 carbon atoms, an alkyloxy group having from 1 to 10 carbon atoms, an alkyl carbonyl group having from 1 to 10 carbon atoms, an alkyl carbonyloxy group having from 1 to 10 carbon atoms, a chloro group, a cyano group, an oxo group, and the like.

Among these substituents, specific examples of Ar having a divalent substituent include, for example, an anthraquinone, a naphthoquinone and the like.

Furthermore, these substituents may be substituted with other substituents. In this case, the preferable substituent has the same definition as described above. Further, in a case in which Ar has two or more of the substituents, respective substituents may be the same or different. Further, if possible, the substituents may be bonded to each other to form a ring.

Among the hydrophobic structural units represented by the Formula (1), from the viewpoints of being excellent in glossiness, adhesiveness, and water resistance when the dispersibility of the pigment is increased to form a cured film, a hydrophobic structural unit where $R^1$ and $R^2$ each independently represent a hydrogen atom, $L^1$ represents an alkylene group having from 1 to 4 carbon atoms, and Ar represents a monovalent group derived from a naphthalene, a biphenyl, a phthalimide, a naphthalimide, or an acridone is more preferred. Further, a hydrophobic structural unit where $R^1$ and $R^2$ each independently represent a hydrogen atom, $L^1$ represents —$CH_2$—, and Ar represents a monovalent group derived from an acridone is further preferred.

The polymer (B) may be any of a structure containing the hydrophobic structural unit (a) represented by the Formula (1) singly or a structure containing two or more kinds thereof.

—(b) Hydrophilic Structural Unit—

It is preferred that the polymer (B) of the invention further contains at least one hydrophilic structural unit (b) in addition to the hydrophobic structural unit (a), from the viewpoint of stability, storage stability, and dischargeability of ink composition. Among them, it is more preferred that the hydrophilic structural unit (b) is contained in a range less than 25% by mass with respect to the total mass of the polymer (B). Moreover, the content of the hydrophilic structural unit (b) with respect to the total mass of the polymer (B) is preferably from 2% by mass to less than 25% by mass, is more preferably from 5% by mass to 22% by mass, and is further preferably from 7% by mass to 20% by mass.

The hydrophilic structural unit is not specifically limited, as long as it has a structural unit having at least one hydrophilic group. Further the hydrophilic group may be a nonionic group or an ionic group. It is preferred that in the invention, at least one ionic group as the hydrophilic group is contained, from the viewpoint of stability, storage stability, and dischargeability. It is more preferred that it contains at least one ionic group selected from a carboxyl group, a phosphoric group, and a sulfonic group. It is even more preferred to contain a carboxyl group.

The hydrophilic structural unit (b) having an ionic group may be formed by a polymerization reaction of an ionic group-containing monomer. Further, the hydrophilic structural unit (b) may be formed by polymerizing a polymer having no an ionic group, and then by introducing an ionic group to the polymer chain.

Examples of the ionic group-containing monomer are described below; however, the invention is not limited thereto. The ionic group-containing monomer may be an anionic group-containing monomer.

Among anionic group-containing monomers, examples of the carboxyl group-containing monomer include, for example, an unsaturated carboxylic acid monomer such as an acrylic acid, a methacrylic acid, a crotonic acid, an itaconic acid, a maleic acid, a fumaric acid, a citraconic acid, and a β-carboxyethyl acrylic acid and a 2-methacryloyloxy methyl succinic acid.

Examples of monomers having the sulfonic acid group include, for example, a styrene sulfonic acid, a 2-acrylamide-2-methylpropane sulfonic acid, a 3-sulfopropyl (meth)acrylate, a bis-(3-sulfopropyl)-itaconic acid ester and the like.

Examples of monomers having an phosphoric group include, for example, a vinyl phosphonic acid, a vinyl phosphate, a bis(methacryloxyethyl)phosphate, a diphenyl-2-acryloyloxyethyl phosphate, a diphenyl-2-methacryloyloxyethyl phosphate, and a dibutyl-2-acryloyloxyethyl phosphate.

Among them, from the viewpoints of viscosity and dischargeability of ink, the ionic group-containing monomers are preferably an unsaturated carboxylic monomer, particularly preferably acrylic acid and methacrylic acid, and most preferably methacrylic acid. Further, the ionic group-containing monomers may be used singly or in mixture with two or more kinds.

In a case in which the polymer (B) of the invention has an acidic group such as a carboxyl group, the acid value of the polymer (B) is preferably in a range of from 32 mg KOH/g to 163 mg KOH/g, more preferably from 32 mg KOH/g to 131 mg KOH/g, and most preferably from 52 mg KOH/g to 131 mg KOH/g.

Further, the acid value is defined by the mass (mg) of KOH necessary for completely neutralizing 1 g of the polymer (B), and is to be measured by the method described in JIS specification (JIS K0070:1992).

—(c) Other Structural Units—

It is preferred that the polymer (B) of the invention further contains, as other structural units in addition to the aforementioned structural units, at least a hydrophobic structural unit (hereinafter, simply also referred to as "structural unit (c)") having a structure different from the hydrophobic structural unit (a). The hydrophobic structural unit (c) is not specifically limited, as long as it has a structure other than the hydrophobic structural unit (a) represented by the Formula (1). The hydrophobic structural unit (c) may be a structural unit containing an aromatic ring or a structural unit not containing an aromatic ring. Further, the structural unit (c) may contain a single structural unit or may contain two or more structural units.

The polymer (B) includes the structural unit (c), and thereby the colorant (A) which is dispersed in the polymer (B) shows better dispersibility. Description of the mechanism is not clear, but it is though to be as follows.

For example, in a case in which the polymer (B) includes a structural unit having opposite properties such as a hydrophobic structural unit (a) mainly showing an affinity to a colorant and a hydrophilic structural unit (b) mainly showing an affinity to an aqueous medium, if in a structure where the polymer (B) is formed by only these, the hydrophobic structural unit (a) and the hydrophilic structural unit (b) inhibits the functions of each other, it can be considered that there is a possibility that dispersibility is insufficient. A case can be considered where the polymer (B) includes a structural unit (c) showing intermediate properties between the hydrophobic structural unit (a) and the hydrophilic structural unit (b), and therefore there is an easing of the tendency for dispersibility to be insufficient and dispersibility is good. In this case, it is preferred that the content of the hydrophobic structural unit (c) is in a range from 30% by mass to 90% by mass with respect to the total mass of the polymer (B).

In a case in which the structural unit (c) is a structural unit having an aromatic ring, the aromatic ring may be bonded to an atom forming the main chain through a linkage group, and may be directly bonded to an atom from the main chain.

The aromatic ring is preferably a substituted or unsubstituted benzene ring, a substituted or unsubstituted naphthalene ring, and more preferably a substituted or unsubstituted benzene ring. From the viewpoints of dispersibility, availability, and general-purpose use properties of colorant (A), an unsubstituted benzene ring is particularly preferred. Further, examples of the substituent in a case in which the aromatic ring is substituted includes, for example, an alkyl group, an alkyloxy group, an aryl group, an arylalkyl group, an aryloxy group, an acyl group, a halogen atom, a cyano group, a nitro group, and the like. An aryl group, an aryl alkyl group, an aryloxy group, and an acyl group are preferred.

The structural unit (c) can be formed by a polymerization reaction of the monomer corresponding to a desirable structural unit. Further, the structural unit may be formed by introducing a hydrophobic functional group into a polymer chain after polymerization of the polymer. The monomer forming the structural unit (c) is not specifically limited as long as it has a hydrophobic functional group and a functional group capable of copolymerizing the hydrophobic structural unit (a) and the hydrophilic structural unit (b). The monomer may be selected from known monomers, without specific limitation.

The monomers forming the structural unit (c) are preferably vinyl monomers (for example, (meth)acrylates, (meth)acrylamides, styrenes, and vinyl esters) from the viewpoint of availability, handleability, and general-purpose use properties.

Examples of the vinyl monomers include, as (meth)acrylates, alkyl(meth)acrylates such as methyl(meth)acrylate, ethyl(meth)acrylate, (iso)propyl(meth)acrylate, (iso- or tertiary-)butyl(meth)acrylate, 2-ethyl hexyl(meth)acrylate, (iso)octyl(meth)acrylate, (iso)decyl(meth)acrylate, and (iso)stearyl(meth)acrylate. Among them, an alkyl ester including an alkyl group having from 1 to 6 carbon atoms of a (meth)acrylic acid is preferred, and an alkyl ester including an alkyl group having from 1 to 4 carbon atoms of a (meth)acrylic acid is more preferred.

Examples of the (meth)acrylamides include (meth)acrylamides such as N-methyl (meth)acrylamide, N-ethyl(meth)acrylamide, N-propyl(meth)acrylamide, N-isopropyl(meth)acrylamide, N-n-butyl acryl(meth)amide, N-t-butyl(meth)acrylamide, N-cyclohexyl(meth)acrylamide, N-(2-methoxyethyl)(meth)acrylamide, N,N-dimethyl(meth)acrylamide, N,N-diethyl(meth)acrylamide, vinyl(meth)

acrylamide, N,N-diallyl(meth)acrylamide, and N-allyl (meth)acrylamide. Among them, (meth)acrylamide and N,N-dimethyl(meth)acrylamide are preferred.

Examples of the styrenes include, for example, styrene, methyl styrene, dimethyl styrene, trimethyl styrene, ethyl styrene, isopropyl styrene, n-butyl styrene, tert-butyl styrene, methoxystyrene, butoxystyrene, acetoxystyrene, chlorostyrene, dichlorostyrene, bromostyrene, chloromethyl styrene, hydroxystyrene protected by a group (for example, t-Boc, or the like) capable of deprotection by acidic substances, methyl vinyl benzoate, and α-methyl styrene, and vinyl naphthalene. Styrene and α-methyl styrene are preferred.

Examples of the vinyl esters include vinyl esters such as vinyl acetate, vinyl chloroacetate, vinyl propionate, vinyl butyrate, vinyl methoxyacetate, and vinyl benzoate. Among them, vinyl acetate is preferred.

From the viewpoints of stability, storage stability, and dischargeability of ink, the structural unit (c) is preferably an alkyl ester including an alkyl group having from 1 to 6 carbon atoms of (meth)acrylic acid (ester formed of alcohol having from 1 to 6 carbon atoms and (meth)acrylic acid), and a structural unit derived from an alkyl ester including an alkyl group having from 1 to 4 carbon atoms is particularly preferred. Among them, a structural unit derived from methyl acrylate, methyl methacrylate, ethyl acrylate, or ethyl methacrylate is further preferred.

The polymer (B) of the invention may be a random copolymer where respective the structural units are irregularly introduced, or may be a regularly introduced block copolymer. Respective structural units may be synthesized in any introduction order in a case in which the polymer is a block copolymer, and may use the same component twice or more, but it is preferred that the polymer is a random copolymer from the viewpoints of general-purpose use properties and manufacturability.

It is preferred that the polymer (B) of the invention is formed so as to have a structure containing from 5% by mass to 30% by mass of a hydrophobic structural unit where in the Formula (1), $R^1$ represents a hydrogen atom or a methyl group, $L^1$ represents a single bond or, a divalent linkage group including at least one selected from the linkage group consisting of an alkylene group having from 1 to 6 carbon atoms, —COO—, and —CONR$^3$— ($R^3$ represents a hydrogen atom, or an alkyl group having from 1 to 6 carbon atoms), $R^2$ represents a hydrogen atom or a methyl group, Ar represents a monovalent group derived from naphthalene, biphenyl, triphenyl methane, phthalimide, naphthalimide, acridone, fluorene, anthracene, phenanthrene, diphenyl methane, or carbazole, 5% by mass to 30% by mass of anionic hydrophilic structural unit, and a structural unit derived from an alkyl ester including an alkyl group having from 1 to 6 carbon atoms of (meth)acrylic acid, from the viewpoints of dispersion stability, glossiness and adhesiveness, and saturation.

Further, it is preferred that the polymer (B) of the invention is formed so as to have a structure containing 5% by mass to 30% by mass of a hydrophobic structural unit where $R^1$ represents a hydrogen atom or a methyl group, $L^1$ represents a single bond or, a divalent linkage group including at least one selected from the linkage group consisting of an alkylene group having from 1 to 6 carbon atoms, —COO—, and —CONR$^3$— ($R^3$ represents a hydrogen atom, or an alkyl group having from 1 to 6 carbon atoms), $R^2$ represents a hydrogen atom or a methyl group, Ar represents a monovalent group derived from naphthalene, biphenyl, phthalimide, naphthalimide, or acridone, 5% by mass to 30% by mass of anionic hydrophilic structural unit (preferably having a carboxyl group), and a structural unit derived from an alkyl ester including an alkyl group having from 1 to 6 carbon atoms of (meth)acrylic acid.

Furthermore, it is more preferred that the polymer (B) of the invention is formed so as to have a structure containing 5% by mass to 25% by mass of a hydrophobic structural unit where in the Formula (1), $R^1$ represents a hydrogen atom, $L^1$ represents a divalent linkage group containing an alkylene group having from 1 to 6 carbon atoms, $R^2$ represents a hydrogen atom, Ar represents a monovalent group derived from naphthalene, biphenyl, phthalimide, naphthalimide, or acridone, 8% by mass to 20% by mass of an anionic hydrophilic structural unit (preferably having a carboxyl group), and a structural unit derived from alkyl ester having from 1 to 4 carbon atoms of (meth)acrylic acid.

The range of the molecular weight of the polymer (B) is preferably 10,000 to 200,000, more preferably 20,000 to 100,000 and most preferably 30,000 to 90,000, in terms of weight average molecular weight (Mw). When the molecular weight is within the range described above, it is preferred that from the viewpoint that there is a tendency for an excellent steric repulsion effect as a dispersant, and further adsorption to a colorant due to the steric effect tends to be rapid. Further, when the molecular weight is 90,000 or less, solution viscosity is hardly increased and handling becomes easy. When the molecular weight is 30,000 or more, stability over time is further improved.

Further, the molecular weight distribution (that is, weight average molecular weight Mw/number average molecular weight Mn) of the polymer (B) is preferably 1 to 6, and is more preferably 1 to 4. When the molecular weight distribution is within the range described above, shortening of dispersion times for the pigment and increased stability of dispersed materials over time are attained.

Herein, the number average molecular weight and the weight average molecular weight are a molecular weight detected by a GPC analyzing device using TSKgel GMHxL, TSKgel G4000HxL, or TSKgel G2000HxL columns (all trade name, produced by Tosoh Corporation), THF as solvent, and a differential refractometer and shown in terms of polystyrene as a standard material.

The polymer (B) may be synthesized by various polymerization methods such as solution polymerization, precipitation polymerization, suspension polymerization, bulk polymerization, and emulsion polymerization. Further, the polymerization reaction may be performed by known operations such as batch system, semi-continuous system, and continuous system. Examples of the method for initiating polymerization include a method using a radical initiator and a method for irradiating radiation rays (including light). The polymerization methods and the methods for initiating polymerization are described in, for example, "High-Molecular Synthesis Method, Teiji Tsuruta, Revised Edition, THE NIKKAN KOGYO SHIMBUN, LTD., (1971)" and "Experimental Technique For High-Molecular Synthesis, co-authored by Takayuki Otsu and Masayoshi Kinoshita, pages 124 to 154, Kagaku-dojin Publishing Company, INC, (1972)".

Among the above polymerization methods, particularly a solution polymerization method using a radical initiator is preferred. In the solvent to be used in the solution polymerization method, for example, various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol may be used singly, or in a mixture of two or more of them. Alternatively, these solvents may be mixed with water.

It is necessary to set the polymerization temperature in association with the molecular weight of the polymer to be produced and the kinds of initiators and the like. Usually, it is a temperature from about 0° C. to about 100° C. It is preferable that the polymerization is performed within a temperature range from 50° C. to 100° C. The reaction pressure may be selected appropriately. Usually, it is a pressure from 1 kg/cm² to 100 kg/cm², and particularly preferably a pressure from about 1 kg/cm² to about 30 kg/cm². The reaction time is about 5 hours to about 30 hours. The obtained polymer may be subjected to purification such as reprecipitation.

Preferable specific examples (exemplified polymers B-1 to B-55) as the polymer (B) are described below. However, the invention is not limited to below.

$$-(-CH_2-\underset{\underset{\underset{\underset{O}{\bigcirc}}{N}}{\underset{|}{C_6H_4-CH_2}}}{\overset{R^{11}}{\underset{|}{C}}})_x-(CH_2-\underset{COOR^{13}}{\overset{R^{12}}{\underset{|}{C}}})_y-(CH_2-\underset{COOH}{\overset{R^{14}}{\underset{|}{C}}})_z-$$

|   | R¹¹ | R¹² | R¹³ | R¹⁴ | x | y | z | Mw | Mw/Mn | Acid value [mgKOH/g] |
|---|---|---|---|---|---|---|---|---|---|---|
| B-1 | H | CH₃ | CH₃ | CH₃ | 5 | 85 | 10 | 38,000 | 2.44 | 65.2 |
| B-2 | H | CH₃ | CH₃ | CH₃ | 7 | 83 | 10 | 40,000 | 2.47 | 65.2 |
| B-3 | H | CH₃ | CH₃ | CH₃ | 10 | 80 | 10 | 40,000 | 2.49 | 65.2 |
| B-4 | H | CH₃ | CH₃ | CH₃ | 15 | 75 | 10 | 40,500 | 2.53 | 65.2 |
| B-5 | H | CH₃ | CH₃ | CH₃ | 20 | 70 | 10 | 41,000 | 2.57 | 65.2 |
| B-6 | H | CH₃ | CH₃ | CH₃ | 15 | 80 | 5 | 42,000 | 2.65 | 32.6 |
| B-7 | H | CH₃ | CH₃ | CH₃ | 15 | 77 | 8 | 42,000 | 2.65 | 52.1 |
| B-8 | H | CH₃ | CH₃ | CH₃ | 15 | 73 | 12 | 41,500 | 2.63 | 78.2 |
| B-9 | H | CH₃ | CH₃ | CH₃ | 15 | 70 | 15 | 40,300 | 2.61 | 97.8 |
| B-10 | H | CH₃ | CH₃ | CH₃ | 15 | 67 | 18 | 40,500 | 2.64 | 117.3 |
| B-11 | H | CH₃ | CH₃ | CH₃ | 15 | 65 | 20 | 42,500 | 2.65 | 130.4 |
| B-12 | H | CH₃ | CH₃ | CH₃ | 15 | 60 | 25 | 43,500 | 2.67 | 162.9 |
| B-13 | H | CH₃ | CH₃ | CH₃ | 15 | 75 | 10 | 22,000 | 2.01 | 65.2 |
| B-14 | H | CH₃ | CH₃ | CH₃ | 15 | 75 | 10 | 32,000 | 2.21 | 65.2 |
| B-15 | H | CH₃ | CH₃ | CH₃ | 15 | 75 | 10 | 50,600 | 2.69 | 65.2 |
| B-16 | H | CH₃ | CH₃ | CH₃ | 15 | 75 | 10 | 60,600 | 2.72 | 65.2 |
| B-17 | H | CH₃ | CH₃ | CH₃ | 15 | 75 | 10 | 81,000 | 2.77 | 65.2 |
| B-18 | H | CH₃ | CH₃ | CH₃ | 15 | 75 | 10 | 99,600 | 2.89 | 65.2 |
| B-19 | H | CH₃ | CH₃ | H | 15 | 75 | 10 | 40,000 | 2.33 | 65.2 |
| B-20 | H | CH₃ | C₂H₅ | H | 15 | 75 | 10 | 40,500 | 2.35 | 65.2 |
| B-21 | H | H | CH₃ | H | 15 | 75 | 10 | 42,100 | 2.41 | 85.7 |
| B-22 | H | H | CH₃ | H | 15 | 75 | 10 | 43,200 | 2.45 | 85.7 |
| B-23 | CH₃ | CH₃ | CH₃ | H | 15 | 75 | 10 | 42,000 | 2.39 | 85.7 |
| B-24 | CH₃ | CH₃ | C₂H₅ | H | 15 | 75 | 10 | 41,600 | 2.35 | 85.7 |
| B-25 | CH₃ | H | CH₃ | H | 15 | 75 | 10 | 44,000 | 2.45 | 85.7 |
| B-26 | CH₃ | H | C₂H₅ | H | 15 | 75 | 10 | 40,300 | 2.15 | 85.7 |
| B-27 | CH₃ | CH₃ | CH₃ | CH₃ | 15 | 75 | 10 | 40,700 | 2.38 | 65.2 |
| B-28 | CH₃ | CH₃ | CH₃ | CH₃ | 15 | 75 | 10 | 41,500 | 2.39 | 65.2 |

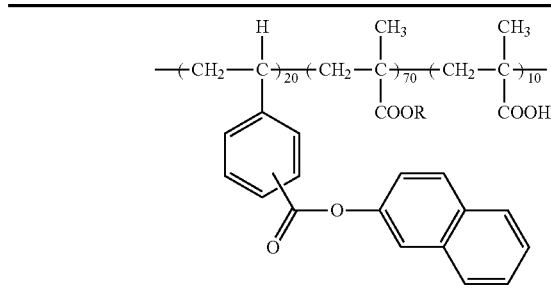

Acid value: 65.2
R = CH₃, $M_w$ ($M_w/M_n$) = 45000 (2.68): B-29
R = C₂H₅, $M_w$ ($M_w/M_n$) = 43000 (2.63): B-30

-continued
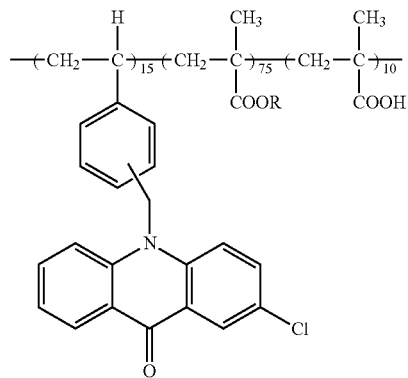
Acid value: 65.2
R = CH₃, $M_w$ ($M_w/M_n$) = 47000 (2.78): B-31
R = C₂H₅, $M_w$ ($M_w/M_n$) = 48000 (2.82): B-32
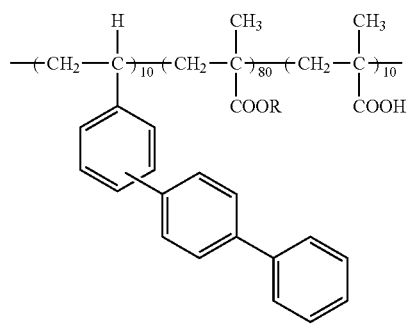
Acid value: 65.2
R = CH₃, $M_w$ ($M_w/M_n$) = 42000 (2.36): B-33
R = C₂H₅, $M_w$ ($M_w/M_n$) = 45000 (2.45): B-34
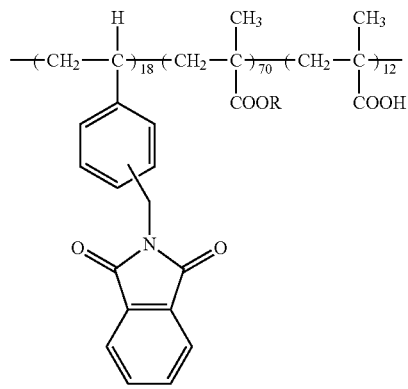
Acid value: 78.2
R = CH₃, $M_w$ ($M_w/M_n$) = 42000 (2.29): B-35
R = C₂H₅, $M_w$ ($M_w/M_n$) = 44000 (2.31): B-36
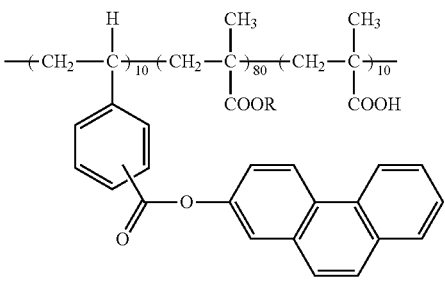

-continued
Acid value: 65.2
R = CH$_3$, M$_w$ (M$_w$/M$_n$) = 31000 (2.33): B-37
R = C$_2$H$_5$, M$_w$ (M$_w$/M$_n$) = 34000 (2.35): B-38
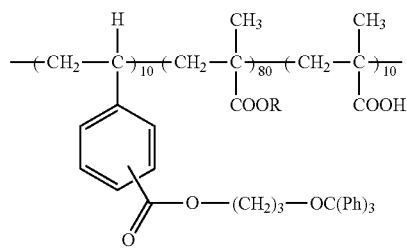
Acid value: 65.2
R = CH$_3$, M$_w$ (M$_w$/M$_n$) = 46000 (2.72): B-39
R = C$_2$H$_5$, M$_w$ (M$_w$/M$_n$) = 48000 (2.75): B-40
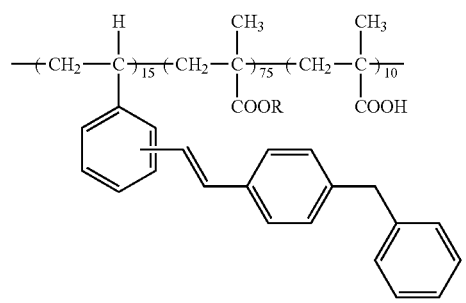
Acid value: 65.2
R = CH$_3$, M$_w$ (M$_w$/M$_n$) = 44000 (2.62): B-41
R = C$_2$H$_5$, M$_w$ (M$_w$/M$_n$) = 46000 (2.71): B-42
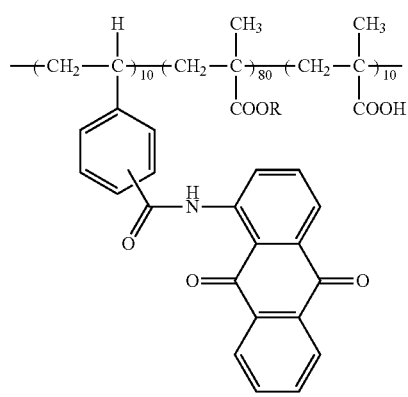
Acid value: 65.2
R = CH$_3$, M$_w$ (M$_w$/M$_n$) = 28000 (2.24): B-43
R = C$_2$H$_5$, M$_w$ (M$_w$/M$_n$) = 31000 (2.26): B-44
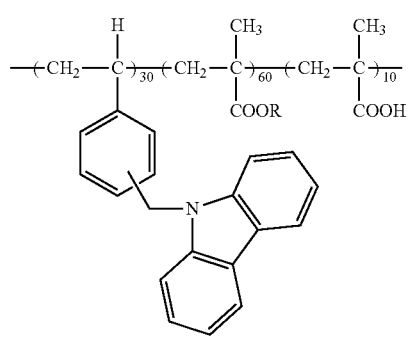

Acid value: 65.2
R = CH$_3$, M$_w$ (M$_w$/M$_n$) = 47000 (2.68): B-45
R = C$_2$H$_5$, M$_w$ (M$_w$/M$_n$) = 49000 (2.71): B-46
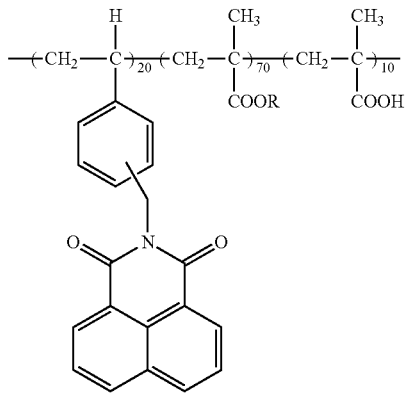
Acid value: 65.2
R = CH$_3$, M$_w$ (M$_w$/M$_n$) = 45000 (2.61): B-47
R = C$_2$H$_5$, M$_w$ (M$_w$/M$_n$) = 46700 (2.70): B-48
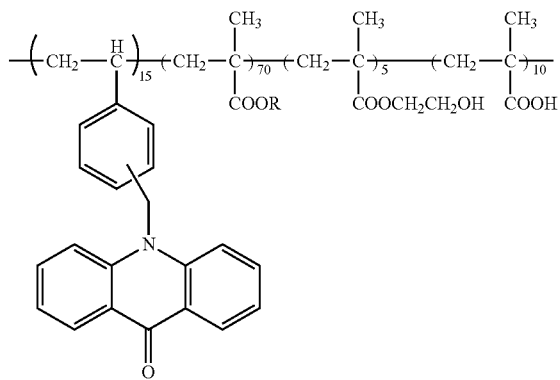
R = CH$_3$, M$_w$ (M$_w$/M$_n$) = 44000 (2.52): B-49
R = C$_2$H$_5$, M$_w$ (M$_w$/M$_n$) = 45000 (2.55): B-50
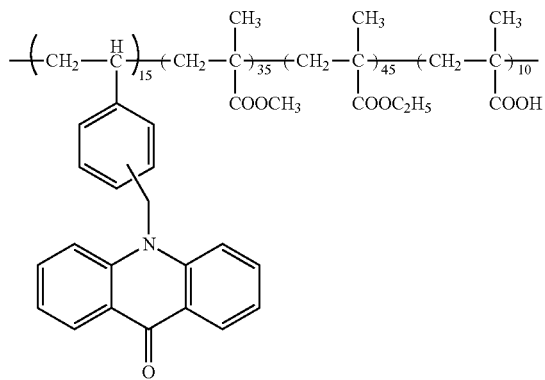

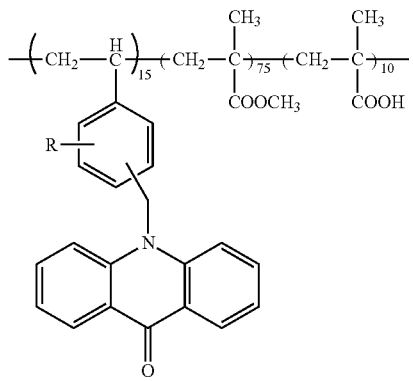

$M_w$ ($M_w/M_n$) = 40000 (2.42): B-51

R = CH$_3$, $M_w$ ($M_w/M_n$) = 42000 (2.55): B-52
R = OC$_2$H$_5$, $M_w$ ($M_w/M_n$) = 40000 (2.53): B-53
R = COCH$_3$, $M_w$ ($M_w/M_n$) = 45000 (2.57): B-54
R = Cl, $M_w$ ($M_w/M_n$) = 39000 (2.50): B-55

The content in the aqueous ink composition of the polymer (B) is not specifically limited, but the ratio (colorant:polymer, mass basis) of the colorant and the polymer is preferably in a range from 1:0.06 to 1:3, more preferably a range of 1:0.125 to 1:2, and even more preferably 1:0.125 to 1:1.5.

It is preferred that, the colorant is dispersed by the polymer to form a dispersed material of colorant particles. The colorant particles can be prepared as the dispersed material by providing, for example, adding (mixing and hydration step) an aqueous solution containing a basic material to a mixture of the colorant, the polymer, and an organic solvent capable of dissolving or dispersing the polymer and removing the organic solvent (solvent-removing step). Thereby, the colorant can be finely dispersed to prepare a dispersed material of the colorant particles which has excellent storage stability.

There is necessary the organic solvent which is capable of dissolving or dispersing the polymer, but in addition, it is preferred that the organic solvent has some degree of affinity with respect to water. Specifically, a solubility in water under at 20° C. is preferably from 10% by mass to 50% by mass.

More specifically, the dispersed material of the colorant particles may be produced by, but is not limited to, a production method of the following steps (1) and (2):
Step (1): dispersing a mixture of a solution containing a basic material as well as a colorant, a polymer and an organic solvent capable of dissolving or dispersing the polymer, and water as the main component.
Step (2): removing at least a portion of the organic solvent.

In the step (1), first the polymer is dissolved or dispersed in the organic solvent to obtain a mixture (mixing step). Subsequently, a solution containing colorant, basic material with water as the main component, water, and as necessary a surfactant and the like are added and is mixed and dispersed with the mixture to obtain an oil-in-water type dispersed material.

The basic material is used for neutralizing an anionic group (preferably, a carboxylic group) which the polymer has in some cases. The neutralizing degree of the anionic group is not specifically limited. Generally, it is preferred that liquid properties of the dispersed material of the colorant particles finally obtained are for example pH of 4.5 to 10. The pH can be also determined according to desirable degree of neutralization of the polymer.

The colorant, polymer and other additives used in the production method of the dispersed material of the colorant particles have the same definition as that for the aforementioned colorant particles, and preferable examples have the same definition as the preferable examples described above.

Preferable examples of the organic solvent include an alcohol-based solvent, a ketone-based solvent, and an ether-based solvent. Among them, examples of the alcohol-based solvent include, for example, ethanol, isopropanol, n-butanol, tertiary butanol, isobutanol, and diacetonealcohol and the like. Examples of the ketone-based solvent include, for example, an acetone, a methyl ethyl ketone, a diethyl ketone, and a methyl isobutyl ketone and the like. Example of the ether-based solvent includes, for example, a dibutyl ether, a tetrahydrofuran, and a dioxane and the like. Among these solvents, an isopropanol, an acetone and a methyl ethyl ketone are preferred, and in particular, a methyl ethyl ketone is preferred. The organic solvent may be used singly or in combination of plural kinds.

In production of the dispersed material of the colorant particles, kneading dispersion treatment may be performed while applying strong shear force by using, for example, a twin roll, a triple roll, a ball mill, a tron mill, a disperser, a kneader, a co-kneader, a homogenizer, a blender, a single-screw or a double-screw extruder. The details of kneading and dispersing are described in "Paint Flow and Pigment Dispersion" written by T. C. Patton (1964, published by John Wiley and Sons).

In producing the dispersed material of the colorant particles, as necessary, fine dispersion treatment may be performed by using, for example, a vertical- or horizontal sand grinder, a pin mill, an a slitting mill, or a ultrasonic disperser with beads made of for example, glass or zirconia having a particle size of 0.01 mm to 1 mm.

In the removal of the organic solvent in the production method of the dispersed material of the colorant particles, the method is not specifically limited and the organic solvent can be removed by known methods such as distillation under reduced pressure.

The volume average particle size of the colorant particles is preferably from 10 nm to less than 200 nm, more preferably from 50 nm to less than 130 nm, and even preferably from 60 nm to less than 100 nm. When the volume average particle size is within this range, a color developing property, dispersion stability, and ejection stability in an ink jet method are good. The volume average particle size of the colorant particles is a value measured by a dynamic light scattering method.

(C) Polymerization Initiator

The aqueous ink composition of the invention contains one or two or more polymerization initiator (C).

The polymerization initiator may be any of a thermal polymerization initiator, and a photo-polymerization initiator. Further, as the polymerization initiator, any of a water-insoluble polymerization initiator dispersed in water and a water-soluble polymerization initiator can be used. Among them, from the viewpoint of forming the ink composition into an aqueous system, it is preferred that the polymerization initiator is a water-soluble polymerization initiator.

Further, water solubility means that the water-soluble polymerization initiator is dissolved at 0.5% by mass or more in distilled water at 25° C. It is preferred that the water-soluble polymerization initiator is dissolved at 1% by mass or more in distilled water at 25° C. It is more preferred that that the water-soluble polymerization initiator is dissolved at 3% by mass or more in distilled water at 25° C.

Examples of the polymerization initiator include, for example, acetophenones, α-aminoketones, benzophenones, alkylphenones, benzyls, benzoins, benzoinethers, benzyl dialkyl ketals, thioxanthones, acyl phosphine oxides, metal complexes, p-dialkyl aminobenzoates, azo compounds, and peroxide compounds. Among them, acetophenone, α-aminoketones, benzyls, benzoinethers, benzyl dialkylketals, thioxanthones, alkyl phenones, and acyl phosphine oxides are preferred, and α-aminoketones, acyl phosphine oxides, and alkyl phenones are more preferred.

Among them, examples of the compounds including in the α-aminoketones include, for example, 2-methyl-1-phenyl-2-morpholinopropan-1-one, 2-methyl-1-[4-(hexyl)phenyl]-2-morpholinopropan-1-one, and 2-ethyl-2-dimethyl amino-1-(4-morpholinophenyl)-butanone-1 and the like. Further, the IRGACURE series produced by Ciba Japan K.K., for example, IRGACURE 907, IRGACURE 369, and IRGACURE 379 are available as commercial products, and these are also compounds included in the α-aminoketones and can be preferably used in the invention.

Examples of the compound included in the acyl phosphine oxides, include, for example, 2,4,6-trimethylbenzoyl-diphenyl-phosphine oxide, and bis(2,4,6-trimethyl benzoyl)-phenyl phosphine oxide and the like.

Examples of the compound included in the alkyl phenones include, for example, 2,2-dimethoxy-1,2-diphenylethan-1-1 one, 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propan-1-one, and 2-hydroxy-1-{4-[4-(2-hydroxy-2-methyl-propionyl)-benzyl]phenyl}-2-methyl-propane-1, and the like. In the IRGACURE series manufactured by Ciba Japan K.K., for example, IRGACURE 651, IRGACURE 184, IRGACURE 1173, IRGACURE 2959, IRGACURE 127, and the like are available as commercial products, and can be preferably used in the invention.

In the invention, among polymerization initiators, a photo-polymerization initiator is preferred.

Example of the photo-polymerization initiator includes the photo-polymerization initiators described in Kiyomi Kato, "Shigaisen Koka System (Ultraviolet Curing System)", pp. 65-148, Sogo Gijutsu Center (1989).

Further, specific examples of the photo-polymerization initiator include, for example, acetophenone, 2,2-diethoxyacetophenone, p-dimethyl aminoacetophenone, p-dimethyl aminopropiophenone, benzophenone, 2-chlorobenzophenone, 4,4'-dichlorobenzophenone, 4,4'-bisdiethyl aminobenzophenone, Michler's ketone, benzyl, benzoin, benzoinmethyl ether, benzonethyl ether, benzoinisopropyl ether, benzoin n-propyl ether, benzoin isobutyl ether, benzoin n-butyl ether, benzyldimethyl ketal, tetramethyl thiuram monosulfide, thioxanthone, 2-chlorothioxanthone, 2-methyl thioxanthone, azobisisobutyronitrile, benzoin peroxide, di-tert-butyl peroxide, 1-hydroxycyclohexylphenylketone and the like, and, for example, aromatic diazonium salt, aromatic halonium salt, aromatic sulfonium salt such as triphenylsulfoniumhexafluorophosphate, diphenyl iodonium hexafluoroantimonate, and metallocene compound.

The photo-polymerization initiator may be used singly or in combination of two or more kinds, or may be combined with sensitizer.

Further, it is preferred that thermal decomposition of the photo-polymerization initiator does not occur to 80° C. An initiator causing thermal decomposition at a temperature range of 80° C. or less is not stably maintained from the viewpoint of the storage of product, and thus it is not preferred.

The content of the polymerization initiator in the aqueous ink composition is preferably 0.1% by mass to 7% by mass, and more preferably 0.3% by mass to 5% by mass, with respect to the total mass of the aqueous ink composition. When the content of the polymerization initiator is 0.1% by mass or more, a cured film having excellent glossiness, adhesiveness, and water resistance is easily obtained when irradiated with radiation rays. When the content of the polymerization is 7% by mass or less, it is advantageous from the viewpoint of uniformity.

Further, the polymerization initiator may be used singly or in combination of two or more kinds.

It is suitable that the content of the polymerization initiator with respect to the (D) polymerizable compound described below is preferably in a range from 0.01 parts by mass to 35 parts by mass, more preferably in a range from 0.1 parts by mass to 30 parts by mass, and even more preferably 0.5 parts by mass to 30 parts by mass, with respect to 100 parts by mass of the (D) polymerizable compound. When the content of the polymerization initiator with respect to the polymerizable compound is 0.01% by mass or more, curing progresses well when radiation rays are irradiated, a cured film having excellent glossiness, adhesiveness, and water resistance is easily obtained. When the content of the polymerization initiator is 35 parts by mass or less, it is advantageous from the viewpoint of uniformity.

Further, the content of the polymerization initiator means the total content of the polymerization initiator.

Examples of the sensitizer include, for example, amine-based (for example, aliphatic amines, amine containing an aromatic group, and piperidine), urea (for example, allyl-based, and o-tolylthiourea), sulfur compounds (for example, sodium diethyl dithiophosphate, and soluble salts of aromatic sulfinic acid), nitrile-based compounds (for example, N,N,-disubstitutioned p-aminobenzonitrile), phosphorus compounds (for example, tri-n-butyl phosphine, and sodium diethyl dithiophosphide), nitrogen compounds (for example, Michler's ketone, n-nitrosohydroxylamine derivatives, oxazolidine compound, tetrahydro-1,3-oxazine compounds, formaldehyde, condensed materials of acetaldehyde and diamine), chlorine compounds (for example, carbon tetrachloride, and hexachloroethane), high-molecular amines of a reaction product of epoxy resin and amine, and triethanolamine triacrylate.

The sensitizer can be contained in a range which does not impair the effect of the invention.

(D) Polymerizable Compound Including an Ethylenically Unsaturated Bond

The aqueous ink composition of the invention contains one or two or more of the polymerizable compounds having an ethylenic unsaturated double bond. The polymerizable compound including an ethylenically unsaturated double bond (hereinafter, simply also referred to as "polymerizable compound") may be any of a water-insoluble compound and a water-soluble compound.

In the invention, the water-soluble polymerizable compound including an ethylenically unsaturated double bond is preferred from the viewpoint of preparing the ink composition into an aqueous system.

Herein, water solubility means that the compound is dissolved at 2% by mass or more in distilled water at 25° C. It is preferred that the compound is dissolved at 15% by mass or more in distilled water at 25° C. It is preferred that the compound is uniformly mixed with water at any ratio.

The polymerizable compound is not specifically limited as long as it is a compound having at least one radical polymerizable ethylenically unsaturated bond in a molecule. The polymerizable compound contains any compound having a chemical forms such as a monomer, an oligomer, a polymer and the like. The polymerizable compound may be used singly or in combination of two or more kinds at any ratio for controlling desirable characteristics. In the invention, from the viewpoints of controlling properties such as reactivity and physical properties, it is preferred that two or more kinds are combined. Further, from the viewpoint of ejection stability of ink, there is preferred a compound which has good solubility in water, and which is difficult to precipitate from the aqueous ink composition.

Examples of the polymerizable compounds include, for example, unsaturated carboxylic acids such as an acrylic acid, a methacrylic acid, an itaconic acid, a crotonic acid, an isocrotonic acid, a maleic acid and the like, and an ester derivative thereof, an amide derivative and a salt thereof, anhydrides having an ethylenic unsaturated group, an acrylonitrile, a styrene, and further various unsaturated polyesters, unsaturated polyethers, unsaturated polyamides, unsaturated urethanes, vinylethers, allylethers and the like. Among them, there is preferred at least one selected from an acrylic acid and a methacrylic acid, and an ester derivative thereof, an amide derivative and a salt thereof, there is more preferred at least one selected from monoesters of acrylic acid and monoesters of methacrylic acid (hereinafter, collectively referred to as "monoacrylate"), esters of acrylic acid and polyol compounds and ester of methacrylic acid and polyol compounds (hereinafter, collectively referred to as "multifunctional acrylate monomer" or "multifunctional acrylate oligomer".), an acrylamide, and a methacrylamide, and a derivative thereof.

The polymerizable compound has a poly(ethyleneoxy) chain, a poly(propyleneoxy) chain, or an ionic group (for example, a carboxyl group, and a sulfo group), or a hydroxyl group is preferable in order to provide a water solubility. In a case in which the compound has a poly(ethyleneoxy) chain or a poly(propyleneoxy) chain, the number of ethyleneoxy unit and propyleneoxy unit is preferably in a range from 1 to 10, and more preferably in a range from 1 to 5. If the number of the unit is 10 or less, hardness of film and adhesiveness of film to a recording medium are improved when the film is cured.

Further, there is a preferable embodiment where monoacrylate, and either a multifunctional acrylate monomer or a multifunctional acrylate oligomer having molecular weight of 400 or more (preferably of molecular weight of 500 or more) are combined as the polymerizable compound, in order to improve sensitivity, bleeding, and adhesiveness to a recording medium. In particular, in an ink composition used in recording on a flexible recording medium such as PET film and PP film, the combination of monoacrylate and either a multifunctional acrylate monomer or a multifunctional acrylate oligomer selected from the group of the compounds is preferred, from the viewpoint that film strength is improved while flexibility of the film is provided to improve adhesiveness.

Further, from the viewpoints that sensitivity, bleeding, and adhesiveness to a recording medium can be further improved while safety is maintained, there is an preferable embodiment where the polymerizable compounds of at least three kinds of monomers from monofunctional monomer, bifunctional monomer and multifunctional monomer of trifunctional monomer or more are combined.

In particular, preferable specific examples of the polymerizable compounds (exemplified compounds 2-1 to 2-5) include the compound having a structure shown below. However, the polymerizable compound of the invention is not limited thereto.

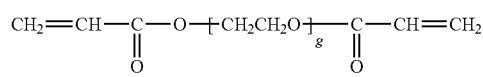

Exemplified compound 2-1

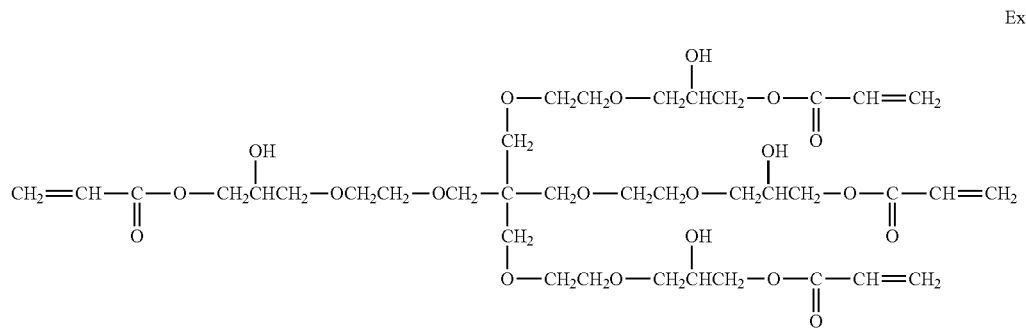

Exemplified compound 2-2

Exemplified compound 2-3

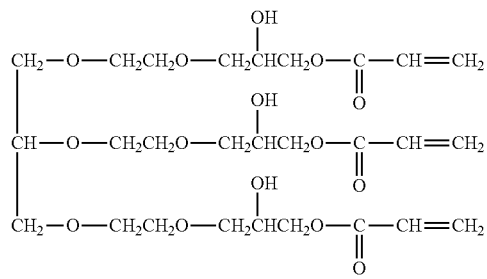

Exemplified compound 2-4

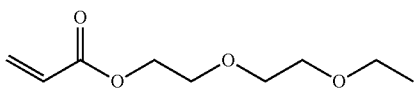

Exemplified compound 2-5

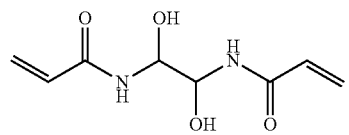

Further, in addition to the exemplified compounds, a compound having an ionic group such as potassium salt of methacrylic acid, and 3-sulfopropyl acrylate is preferred.

The content of polymerizable compound including an ethylenically unsaturated bond in the aqueous ink composition is preferably 1% by mass to 30% by mass, and more preferably 5% by mass to 20% by mass, with respect to the total mass of the aqueous ink composition. When the content of the polymerizable compound is 1% by mass or more, a curing reaction progresses well. When the content of the polymerizable compound is 30% by mass or less, it is advantageous from the viewpoint of aggregability.

(E) Water

In the aqueous ink composition of the invention, it is preferred that water used as a main solvent does not contain ionic impurities such as an ion exchange water, a distilled water and the like. The content of water in the aqueous ink composition may be selected suitably according the purpose, but it is generally preferably from 10% by mass to 95% by mass, and more preferably from 30% by mass to 90% by mass.

(F) Organic Solvent

The aqueous ink composition of the invention contains water as the solvent, but it is preferred that the ink composition further contains at least one organic solvent. The aqueous ink composition contains the organic solvent, so that nonvolatility is provided to the aqueous ink composition, and viscosity can be reduced and further wettability of a recording medium can be improved.

For example, drying prevention, wetting or permeation promotion may be provided by the organic solvent.

By drying prevention due to the organic solvent, clogging of the nozzle which may be generated along with ink drying in an ink jet port may be prevented. In the invention, a water-soluble organic solvent having vapor pressure lower than that of water is preferred, which is particularly effective from the viewpoint of drying prevention. Further, water solubility means that organic solvent is dissolved at 1 g or more in 100 g of water (25° C.).

Specific examples of the organic solvents suitable for the drying prevention include polyhydric alcohols typified by an ethylene glycol, a propylene glycol, a diethylene glycol, a polyethylene glycol, a thiodiglycol, a dithiodiglycol, a 2-methyl-1,3-propanediol, a 1,2,6-hexanetriol, acetylene glycol derivatives, a glycerin, a trimethylolpropane and the like; lower alkyl ethers of polyhydric alcohol such as an ethylene glycol monomethyl (or ethyl)ether, a diethylene glycol monomethyl (or ethyl)ether and a triethylene glycol monoethyl (or butyl)ether and the like; heterocycles such as a 2-pyrrolidone, a N-methyl-2-pyrrolidone, a 1,3-dimethyl-2-imidazolidinone, N-ethylmorpholine and the like; sulfur-containing compounds such as a sulfolane, a dimethylsufoxide and a 3-sulforene and the like; polyfunctional compounds such as a diacetone alcohol and a diethanolamine; and urea derivatives. Among them, polyhydric alcohols such as a glycerin, a diethylene glycol and the like are preferred as the organic solvent from the viewpoint of drying prevention.

As a drying prevention agent, the organic solvents may be used singly or in combination of two or more kinds thereof.

The ink composition can be made to permeate well into a recording medium (printing paper) by permeation promotion due to the organic solvents.

Specific examples of the organic solvents suitable for permeation promotion which may be preferably used include alcohols such as an ethanol, an isopropanol, a butanol, a di(tri)ethylene glycol monobutyl ether and a 1,2-hexanediol; sodium lauryl sulfate, sodium oleate, nonionic surfactants or the like. The organic solvent is preferably used within a range from the addition amount such that bleeding of printing and print-through are not generated, from the viewpoint of permeation promotion.

Other than the applications described above, the organic solvent may be used to adjust viscosity. Specific examples of the organic solvent which is suitable for adjusting viscosity include alcohols (for example, methanol, ethanol, propanol, isopropanol, butanol, isobutanol, sec-butanol, t-butanol, pentanol, hexanol, cyclohexanol and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether), amines (for example, ethanolamine, diethanolamine, triethanolamine, N-methyl diethanolamine, N-ethyl diethanolamine, morpholine, N-ethylmorpholine, ethylene diamine, diethylene triamine, triethylene tetramine, polyethylene imine and tetramethylpropylene diamine), and other polar solvents (for example, formamide, N,N-dimethylformamide, N,N-dimethylacetamide, diemethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone).

It is preferred that the organic solvent is preferably selected from glycerin, ethylene glycol, diethylene glycol or a mixture of these, which has high performance in ink-jet recording suitability.

Generally, the content of the organic solvent in the aqueous ink composition is preferably 0.5% by mass to 5% by mass with respect to the total mass of the aqueous ink composition.

(G) Resin Particle

The aqueous ink composition of the invention may further contain resin particles. Fixing and abrasion resistance of images may be increased by containing the resin particle.

Examples of the resin particles include, for example, particles of acrylic-based resins, vinyl acetate-based resins, styrene-butadiene-based resins, vinyl chloride-based resins, acryl-styrenic-based resins, butadiene-based resins, styrenic-based resins, crosslinked acrylic-based resins, crosslinked styrenic-based resins, benzoguanamine resins, phenolic resins, silicone resins, epoxy resins, urethane-based resins, paraffin-based resins, and fluorine-based resins. These resins may be preferably used in the form of latexes including these particles.

Among the above resins, preferable examples include acrylic-based resins, acryl-styrenic resins, styrenic-based resins, crosslinked acrylic-based resins, and crosslinked styrenic-based resins.

The weight average molecular weight of the resin particles is preferably 10,000 or more, more preferably from 10,000 to 200,000, and even more preferably from 100,000 to 200,000.

The average particle size of the resin particle is preferably in a range from 10 nm to 1 μm, more preferably from 10 nm to 200 nm, even more preferably in a range from 20 nm to 100 nm, and particularly preferably in a range from 20 nm to 50 nm.

The glass transition temperature (Tg) of the resin particles is preferably 30° C. or higher, more preferably 40° C. or higher, and even more preferably 50° C. or higher.

The content of the resin particles in the aqueous ink composition is preferably from 0.1% by mass to 20% by mass, more preferably from 0.1% by mass to 20% by mass, and even more preferably from 0.1% by mass to 15% by mass with respect to the total mass of the aqueous ink composition. The particle size distribution of the polymer particles is not particularly limited and may have a broad particle size distribution or a monodisperse particle size distribution. Alternatively, a mixture of two or more kinds of resin particles each having a monodisperse particle size distribution may be used.

(H) Other Additives

The aqueous ink composition of the invention may contain other additives in addition to the component described above. Examples of other additives include known additives such as a surface tension regulator, a leveling agent, a polymerization inhibitor, an antioxidant agent, a drying prevention agent (wetting agent), an anti-fading agent, an emulsion stabilizer, a permeation promoting agent, an ultraviolet absorber, a hindered amine light stabilizer (HALS), an antiseptic agent, an antifungal agent, a pH regulator, a defoaming agent, a viscosity adjustment agent, a dispersant, a dispersion stabilizer, an antirust agent, a chelating agent, and a fungicide. These various additives are directly added to ink in a case of ink composition, and is generally added to a dispersed material after preparing a dye dispersed material in a case in which oily dyes are used as a dispersoid, but various additives may be added to an oily phase or a water phase during preparation of the dye dispersed material.

Surface Tension Regulator

It is preferred that the aqueous ink composition of the invention contains at least one surface tension regulator. By containing a surface tension regulator, the surface tension may be regulated suitably according to an image forming method. For example, in a case in which the aqueous ink composition is used in an ink jet recording method, the surface tension of the aqueous ink composition may be optimized from the viewpoint of balance of curing and permeation such that an image having high quality and high density may be particularly formed on a plain paper.

Examples of the surface tension regulator include nonionic surfactants, cationic surfactants, anionic surfactants, and betaine surfactants. In order to achieve good ink ejection by the ink-jet method, the surface tension regulator is preferably added in an amount such that the ink of the invention has a surface tension of 20 mN/m to 60 mN/m. Further, the surface tension regulator is preferably added in an amount such that the surface tension is from 20 mN/m to 45 mN/m, and even more preferably the surface tension is from 25 mN/m to 40 mN/m.

As examples of the surfactant in the invention, compounds having a structure containing hydrophilic portion and hydrophobic portion within one molecule thereof may be used effectively. For the surfactants, each of anionic surfactants, cationic surfactants, ampholytic surfactants, or nonionic surfactants may be used.

A high-molecular compound (for example, high-molecular dispersant) may be used as the surfactant.

Specific examples of the anionic surfactants include, for example, a sodium dodecylbenzene sulfonate, a sodium lauryl sulfate, a sodium alkyl diphenyl ether disulfonate, sodium alkyl naphthalene sulfonate, a sodium dialkyl sulfosuccinate, a sodium stearate, a potassium oleate, a sodium dioctyl sulfosuccinate, a sodium polyoxyethylene alkyl ether sulfate, a sodium polyoxyethylene alkyl ether sulfate, a sodium polyoxyethylene alkyl phenyl ether sulfate, a sodium dialkyl sulfosuccinate, a sodium stearate, a sodium oleate, and a sodium t-octylphenoxy ethoxypolyethoxyethyl sulfate. Specific examples of the nonionic surfactants include, for example, a polyoxyethylene lauryl ether, a polyoxyethylene octylphenyl ether, a polyoxyethylene oleylphenyl ether, a polyoxyethylene nonylphenyl ether, an oxyethylene-oxypropylene block copolymer, a t-octylphenoxyethylpolyethoxyethanol, a nonylphenoxyethyl polyethoxyethanol and the like, or acetylene glycol-based surfactant (for example, SURFYNOLS (Air Products & Chemicals Inc.) or Olfin (all produced by Nissin Chemical Industry CO., Ltd.). Examples of the cationic surfactants include, for example, tetraalkyl ammonium salts, alkylamine salts, benzalkonium salts, alkylpyridium salts, and imidazolium salts. And specific examples thereof include, for example, a dihydroxyethylstearylamine, a 2-heptadecenyl-hydroxyethylimidazoline, a lauryldimethylbenzylammonium chloride, a cetylpyridinium chloride, a stearamidomethylpyridinium chloride and the like. The surfactant may contain one or two or more compounds selected from these compounds.

The content of the surfactant in a case of in which the aqueous ink composition contains the surfactant is not specifically limited, but is preferably 1% by mass or more, more preferably 1% to 10% by mass, and even more preferably 1% to 3% by mass, with respect to the total mass of the aqueous ink composition.

pH Regulator

The aqueous ink composition of the invention may contain a neutralizer (organic base and inorganic alkali) as the pH regulator. The storage stability of the ink composition can be improved by containing the pH regulator. The pH regulator may be preferably added in an amount such that the ink composition has a pH of from 6 to 10, and more preferably added in an amount such that the ink composition has a pH of from 7 to 10.

In a case in which the aqueous ink composition contains other additives, it is preferred that generally other additives are contained in a range from 0.1% to 5% on a mass basis with respect to the total mass of aqueous ink composition.

In a case in which the aqueous ink composition of the invention is applied in for example, an ink jet recording method, viscosity is preferably in a range from 5 mPa·s to 15 mPa·s. In the case of an ink jet recording method that fine, high-density, and high-driving frequency nozzles are used, the upper limit of the viscosity is preferably 10 mPas. The viscosity of the aqueous ink composition may be measured using for example, a Brookfield viscometer at 20° C.

The aqueous ink composition preferably has a surface tension in a range from 35 mN/m (dyne/cm) to 50 mN/m (dyne/cm) in view of forming an image on plain paper. For a normal aqueous ink jet ink, the surface tension is adjusted to a low value of about 30 mN/m and the ink is allowed to be permeated within a short period of time. Thus, a bleeding phenomenon is suppressed, but in this case, there is a reduction in image density. Meanwhile, for the aqueous ink composition of the invention, fluidity of the aqueous ink composition of the present invention may be suppressed by curing, and thus, the surface tension is increased to hold ink droplets on a surface layer of a recording medium as much as possible, to thereby satisfy bleeding properties and image density. For ensuring image density, the ink droplets are required to be somewhat wet on a recording medium when radiation rays are irradiated. Thus, the upper limit of the surface tension is preferably about 50 mN/m.

Further, the surface tension of the aqueous ink composition may be measured by, for example, a plate method at 25° C.

Image Forming Method

The image forming method of the invention includes providing the aqueous ink composition of the invention on a recording medium by the ink-jet method, and irradiating the aqueous ink composition provided on the recording medium with active radiation rays. The image forming method of the invention includes, as necessary, drying an ink, or fixing the formed image by heating and pressing.

In the image forming method of the invention, because the aqueous ink composition of the invention including a polymer containing a hydrophobic structural unit having a specific structure in combination with a polymerization initiator and a polymerizable compound is provided and the aqueous ink composition is irradiated with active radiation rays, high image density is obtained and an image having excellent glossiness, adhesiveness, and water resistance can be obtained when an image is formed.

—Providing Ink—

In providing ink, the aqueous ink composition is provided on the recording medium by an ink jet method. The method where the aqueous ink composition of the invention is provided on the recording medium to form an image is not specifically limited, and a known method capable of forming the image may be used. Specific methods include, for example, a method providing the aqueous ink composition on the recording medium by means such as an ink jet method, a mimeograph method, and a transfer printing method.

Among them, from the viewpoints of compacting of recording device and high speed recording properties, there is a preferable embodiment where the aqueous ink composition of the invention is provided by an ink-jet method.

An image obtained by using the ink-jet method is specifically formed by providing energy to eject a liquid composition on a desirable recording medium, that is, a plain paper, a resin coated paper, an ink jet paper as those described in for example, JP-A Nos. 8-169172, 8-27693, 2-276670, 7-276789, 9-323475, 62-238783, 10-153989, 10-217473, 10-235995, 10-337947, and 10-217597, a film, electrophotographic common paper, fabrics, glass, metal or ceramics. In addition, as a preferable ink-jet method applied to the invention, the ink-jet method described in the paragraphs [0093] to [0105] of JP-A No. 2003-306623 may be applied.

The ink-jet method is not specifically limited, and may use a known method such as a charge controlling method of discharging ink using electrostatic attraction, a drop-on-demand method (pressure pulse method) of using vibratory pressure of piezo elements, an acoustic ink jet method of discharging ink using the radiation pressure of the ink irradiated by an acoustic beam converted from an electric signal, and a thermal ink jet (Bubble Jet (registered trademark)) method of using a pressure generated by bubbles formed in the ink by heating.

Further, the ink jet heads used in the ink jet method may be of an on-demand or a continuous method. When recording is performed by the ink jet method, an ink nozzle or the like to be used is not specifically limited, and may be suitably selected according to the purpose.

Further, examples of the ink jet method include a method of discharging many droplets of a low concentration ink, which is referred to as photo ink, at a small volume, a method of improving the image quality using plural inks having substantially the same color and different concentrations, and a method of using a colorless and transparent ink.

For the ink jet method, the shuttle method in which a short serial head is used and recording is performed while scanning the head in the width direction of a recording medium, and a line method using a line head in which recording elements are arranged to cover the entire range of one side of a recording medium may be used. In the line method, images may be recorded on the whole face of a recording medium by scanning the recording medium in a direction perpendicular to the alignment direction of the recording element, and a transportation system such as a carriage for scanning short head is unnecessary. Further, complicate scanning control of moving of the carriage and a recording medium is unnecessary. In addition, only the recording medium is moved, so that recording may be performed at a higher speed as compared with the shuttle method.

The amount of ink droplets ejected from the ink jet head is preferably from 1 pL to 10 pL (picoliter), and more preferably from 1.5 pL to 6 pL from the viewpoints of obtaining high precise image. Further, from the viewpoints of improving image unevenness and continuity of continuous gradation, it is effective that different amounts of droplets are combined and ejected. Even in this case, the invention may be preferably used.

—Irradiating—

In irradiating, the aqueous ink composition provided on the recording medium by the ink-providing above is irradiated with active radiation rays. The polymerizable compound of the aqueous ink composition is polymerized by irradiation of the active radiation rays to form a cured film containing a colorant.

The active radiation rays are not specifically limited, as long as the polymerizable compound can be polymerized. Examples of the active radiation rays include, for example, ultraviolet rays, and electron rays. Among them, from the viewpoint of general-purpose use properties, ultraviolet rays are preferred.

As means for irradiation of ultraviolet rays, general-purpose means may be applied. In particular, an ultraviolet irradiation lamp is preferably used. The ultraviolet irradiation lamp is preferably a so-called low-pressure mercury lamp which has a mercury vapor pressure of 1 Pa to 10 Pa when turned on, a high-pressure mercury lamp, and a mercury lamp coated with a phosphor. An emission spectrum of those mercury lamps in a ultraviolet range is 450 nm or shorter, and particularly preferably in a range from 184 nm to 450 nm, which is suitable for efficiently reacting the polymerizable compounds in black or colored aqueous ink composition. In addition, such lamps are preferred because, when incorporating a power source to a printer, a compact power source can be used.

Examples of the mercury lamps include, for example, a metal halide lamp, a high-pressure mercury lamp, an ultra-high-pressure mercury lamp, a xenon flash lamp, a deep UV lamp, a lamp externally exciting a mercury lamp by using microwave with no electrode, a UV laser and the like. An emission wavelength range includes the above range. Thus, any lamp can be basically applied if a power source size, an incident light intensity, and a lamp shape are suitable. In addition, a light source is selected according to sensitivity of a polymerization initiator used as well.

The intensity of ultraviolet necessary for irradiation is preferably 500 mW/cm² to 5,000 mW/cm² in a wavelength range effective for curing. If the irradiation intensity is low, the formation of image having an high quality and fastness may be hindered. Inversely, if the irradiation intensity is excessively high, recording medium may be damaged or caused fading of coloring materials.

EXAMPLES

Hereinbelow, the invention will be described in detail by way of Examples. However, the invention is not limited to these Examples as long as the scope of the invention is not impaired. In the description of examples, unless otherwise specified, "parts" refers to parts by mass.

Example 1

Synthesis of Monomer and Polymer

Synthesis Example 1

Synthesis of Monomer (1) Synthesis of Monomer M-1

1,800 mL of dimethyl sulfoxide dissolving 375 g of 9(10H)-acridone and 84.8 g of sodium hydroxide were charged in a 5 L three-necked flask equipped with a stirrer and a cooling tube, followed by stirring at room temperature for 10 minutes. Into the flask, 440 g of chloromethyl styrene was added dropwise over 10 minutes, the mixed solution was washed with 300 mL of dimethyl sulfoxide together, followed by heating to 55° C. and a reaction was performed for 7 hours. After completion of the reaction, a mixed solution of 750 mL of methanol and 750 mL of water was added dropwise at 55° C. over 10 minutes, followed by stirring at 40° C. for 30 minutes, and further stirring at 30° C. or less for 1 hour. The obtained slurry was taken out by filtration under reduced pressure, and 3 L of methanol was added to the slurry in the 5 L three-necked flask, followed by stirring at 50° C. for 30 minutes, and at 45° C. or less for 30 minutes, at 30° C. or less for 1 hour, filtration was performed under reduced pressure to obtain 484 g of a monomer M-1.

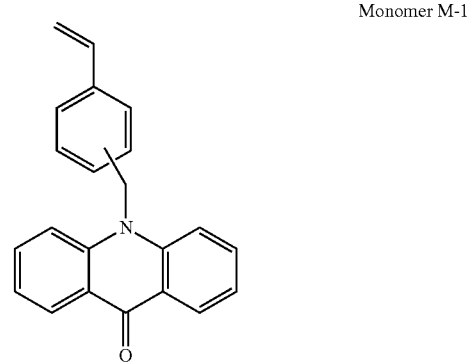

Monomer M-1

(2) Synthesis of Monomer M-11

355 g of 1,8-naphthalimide, 0.57 g of nitrobenzene and 1,500 mL of N-methyl pyrrolidone were charged and dissolved in a 5 L three-necked flask equipped with a stirrer and a cooling tube. 301.4 g of diazabicycloundecene was added dropwise thereto at room temperature, followed by stirring for 30 minutes, 414 g of chloromethyl styrene was added dropwise over 10 minutes, followed by stirring for 10 minutes, heating at 60° C., and reaction was performed for 4 hours. After completion of the reaction, 2.7 L of isopropanol and 0.9 L of water were added thereto, followed by stirring at 5° C. The obtained precipitation was separated by filtration, followed by washing with 1.2 L of isopropanol to obtain 544 g of a monomer M-11.

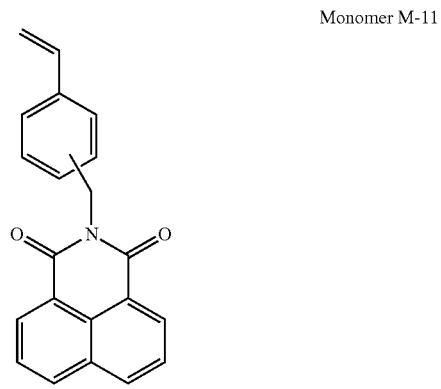

Monomer M-11

(3) Synthesis of Other Monomers

In addition, the following monomers M-2 to M-10 were synthesized in the same manner as above.

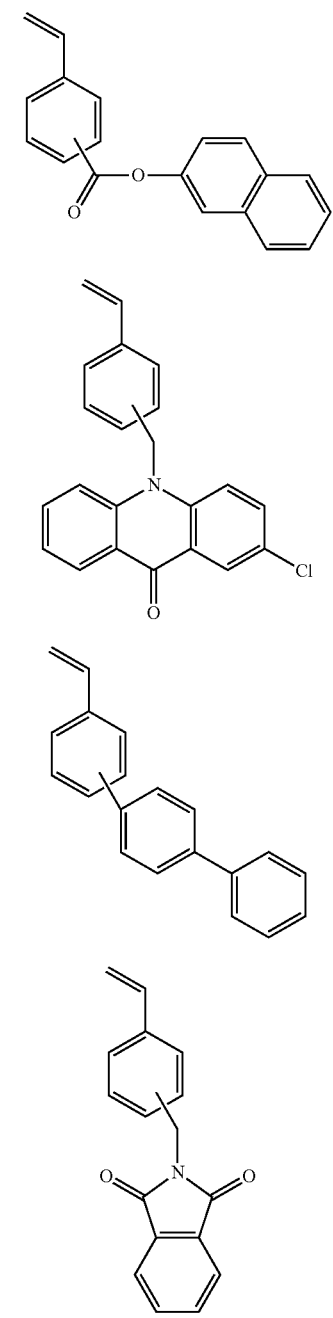

Monomer M-2

Monomer M-3

Monomer M-4

Monomer M-5

Monomer M-6

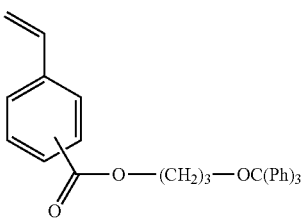

Monomer M-7

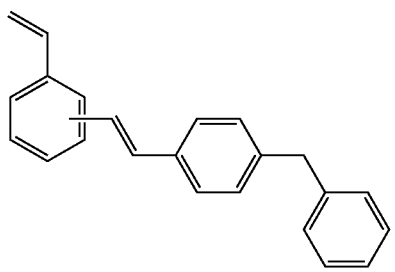

Monomer M-8

Monomer M-9

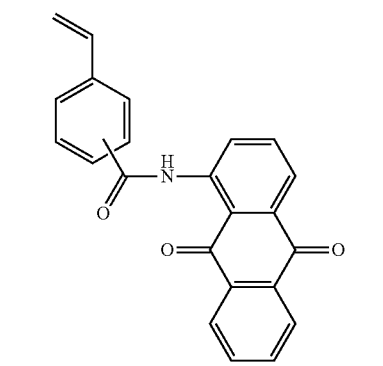

Monomer M-10

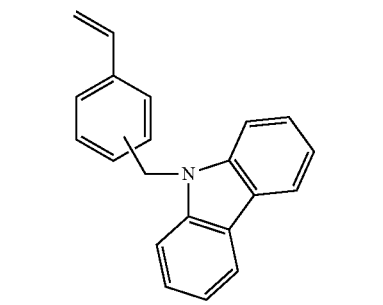

Synthesis Example 2

Synthesis of Polymer B-4

75 g of the monomer M-1, 50 g of methacrylic acid, 375 g of methyl methacrylate, 120 mg of hydroquinone, and 736 g of methyl ethyl ketone were added in a 300 mL three-necked flask equipped with a stirrer and a cooling tube, followed by heating at 75° C. under nitrogen atmosphere. 9 g of dimethyl-2,2'-azobisisobutyrate dissolved in 40 g of methyl ethyl ketone was added in the three-necked flask, and a reaction was performed for 2 hours, 2.5 g of dimethyl-2,2'-azobisisobutyrate dissolved in 10 g of methyl ethyl ketone was added thereto, and a reaction was further performed for 2 hours. 10 g of dimethyl-2,2'-azobisisobutyrate dissolved in 2.5 g of methyl ethyl ketone was added thereto, followed by raising the temperature to 80° C. The resultant was heated and stirred for 4 hours, and an unreacted monomer was completely reacted. After completion of the reaction, methyl ethyl ketone was added to the obtained polymer solution to prepare 35% by mass of polymer B-4 (the exemplified polymer B-4 described above) solution.

The composition of the obtained polymer was confirmed by $^1$H-NMR. Further, the weight average molecular weight (Mw) of the polymer B-4 was detected by using a GPC analyzing device where columns of TSKgel GMHxL, TSKgel G4000HxL, TSKgel G2000HxL (all trade name, produced by Tosoh Corporation) were connected in series, solvent of THF, and a differential refractometer and was obtained in terms of polystyrene as a standard material. As a result, the weight average molecular weight was 40,500. Further, the acid value of the polymer was obtained by a method described in JIS specification (JIS K0070:1992). As a result, the acid value was 65.2 mg KOH/g.

Synthesis Example 3

Synthesis of Other Polymers

The aforementioned exemplified polymers B-1 to B-3, B-5 to B-20, B-22, B-24, B-35, B-43, B-45, and B-47, B-49, and B-51 were synthesized in the same manner as synthesis of the polymer B-4, except that kind and ratio of each of the monomers was changed and synthesized respectively so as to have structures of respective polymers in the synthesis of the each polymer.

With respect to these polymers, the weight average molecular weight (Mw) and the acid value were obtained in the same manner as above. Details of the Mw and the acid value are shown in the following Table 1 to 2.

Synthesis Example 4

Synthesis of Comparative Polymer D-1

The polymer D-1 was synthesized by the following scheme according to the method described in paragraphs [0087] to [0089] of JP-A No. 2009-84494. The composition of the obtained polymer was confirmed by $^1$H-NMR, and the molecular average molecular weight (Mw) obtained by GPC was 36,000. Further, the acid value of the polymer was obtained by the method described in JIS specification (JIS K0070:1992). As a result, the acid value was 65.2 mg KOH/g.

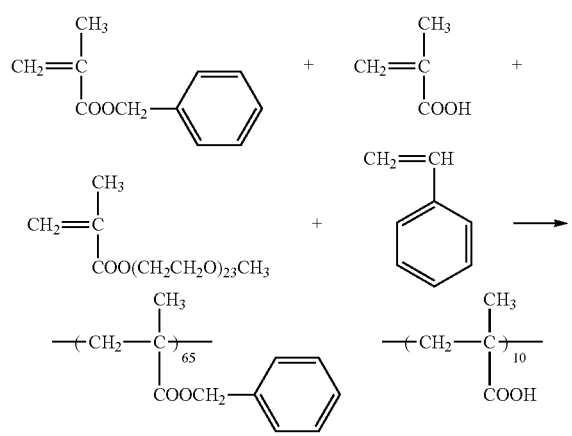

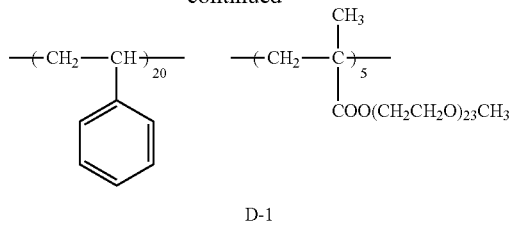

D-1

Synthesis Example 5

Synthesis of Comparative Polymer D-2

33 g of methyl ethyl ketone was added in a 500 mL three-necked flask equipped with a stirrer and a cooling tube, followed by heating to 75° C. under nitrogen atmosphere. A solution which dissolves 8 g of dimethyl-2,2'-azobisisobutyrate, 66 g of styrene, 10 g of butyl acrylate, and 24 g of acrylic acid in 70 g of methyl ethyl ketone was added dropwise thereto over 3 hours. After completion of dropping, reaction was further performed for 1 hour, and then a solution dissolving 0.2 g of dimethyl-2,2'-azobisisobutyrate in 2 g of methyl ethyl ketone was added thereto. Then the temperature was raised to 78° C., and the resultant was continuously heated for 4 hours as it is. The obtained reaction solution was precipitated twice with a large excess of hexane, and the precipitated polymer was dried to obtain 95 g of a comparative polymer D-2.

The composition of the obtained polymer was confirmed by $^1$H-NMR, the weight average molecular weight (Mw) obtained by GPC was 16,200. Further, the acid value of the polymer was obtained by the method described in JIS specification (JIS K0070:1992). As a result, the acid value was 187.0 mg KOH/g.
D-2

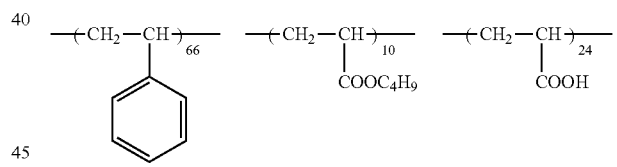

Mw = 16,200; Acid value 187.0 mgKOH/g

<Preparation of Dispersed Material (Pigment Dispersed Material E-4) of Pigment-Containing Resin Particle>

10 parts of pigment•red 122 (PR122; produced by Ciba Japan K.K., trade name: CROMOPHTAL Jet Magenta DMQ), 5 parts of the exemplified polymer B-4 solution, 42 parts of methyl ethyl ketone, 6.2 parts of 1 mol/L NaOH aqueous solution, 87.2 parts of ion exchange water were mixed, and dispersed with 0.1 mmφ zirconia beads in a bead mill for 2 to 6 hours.

The obtained dispersed material was placed under reduced pressure at 55° C., so that methyl ethyl ketone was removed and a portion of the water was further removed, to thereby obtain a dispersed material of a pigment-containing resin particle having a pigment concentration of 10.2% by mass. Further, the resultant was centrifuged by a centrifugal separator (05P-21, produced by Hitachi, Ltd.) for 30 minutes at 5,000 rpm, and ion exchange water was added thereto so as to have pigment concentration of 5% by mass. The resultant was pressurized and filtered using 2.5 μm of membrane filter (produced by Advantec Mfs Inc.), and then ion exchange water was added thereto so as to have a pigment concentration of 4% by mass, to obtain a pigment dispersed material E-4.

<Preparation of Pigment Dispersed Materials E-1 to E-3, E-5 to E-31>

Pigment dispersed materials E-1 to E-3, E-5 to E-31 were prepared respectively in the same manner as production of the pigment dispersed material E-4, except that the exemplified polymer B-4 and pigment•red 122 were replaced with a polymer and pigment shown in the following Table 1 to 2 in the preparation of the pigment dispersed material E-4. Description of the pigments described in Table 1 to 2 is as follows.

PR122; C.I. pigment Red 122 (Produced by Ciba Japan K.K., trade name: CROMOPHTAL Jet Magenta DMQ)

PY74; C.I. pigment Yellow 74 (Produced by Ciba Japan K.K., trade name: Irgalite Yellow GS)

CB; Carbon Black (produced by Degussa, trade name: NIPEX180-IQ)

PB15:3; C.I. pigment Blue 15:3 (Produced by Ciba Japan K.K., trade name: CROMOPHTAL Blue PD4167)

<Preparation of Pigment Dispersed Material E-32>

A pigment dispersed material E-32 was prepared using polymer D-1 and pigment•red 122 according to the method described in paragraphs [0091] to [0093] JP-A No. 2009-84494.

<Preparation of Pigment Dispersed Material E-33>

A pigment dispersed material E-33 was prepared using polymer D-2 and pigment•red 122 according to the method described in paragraph [0072] JP-A No. 2008-247940.

<Preparation of Aqueous Ink Composition F-4>

An aqueous ink composition F-4 of the invention was obtained by using the pigment dispersed material E-4 and by mixing and stirring respective components shown in the following ink composition, using high speed water-cooling type stirrer.

<Ink Composition>

Pigment dispersed material E-4 . . . 33 parts

A forementioned exemplified compound 2-1 (the polymerizable compound) . . . 18 parts A forementioned exemplified compound 2-4 (the polymerizable compound) . . . 2 parts IRGACURE 2959 (produced by Ciba Japan K.K.; the photo-polymerization initiator) . . . 3 parts Olfin E1010 (produced by Nissin Chemical Industry CO., Ltd.; nonionic surfactant) . . . 1 part Ion exchange water . . . 43 parts <Preparation of Aqueous Ink Composition F-1 to F-3, F-5 to F-31>

Aqueous ink compositions F-1 to F-3, and F-5 to F-31 were prepared respectively in the same manner as the preparation of the aqueous ink composition F-4, except that the pigment dispersed material E-4 of the composition was changed to the pigment dispersed material E-1 to E-3, E-5 to E-31 respectively in the preparation of the aqueous ink composition F-4.

<Preparation of Aqueous Ink Composition F-32>

A comparative aqueous ink composition F-32 was prepared by using the pigment dispersed material E-32 according to the method described in paragraph [0095] of JP-A No. 2009-84494.

<Preparation of Aqueous Ink Composition F-33>

Aqueous ink compositions F-33 were prepared in the same manner as the preparation of the aqueous ink composition F-4, except that the pigment dispersed material E-4 of the composition was replaced with the pigment dispersed material E-33 in the preparation of the aqueous ink composition F-4.

<Evaluation 1>

With respect to each of the aqueous ink compositions described above, D95 particle size, viscosity, and sedimentation properties were measured by the following method and dispersion stability was evaluated according to the following evaluation criteria from these results. Further, D95 particle size, viscosity, and sedimentation properties were measured by using pigment dispersed materials and were used as index for evaluating the dispersion stability of the ink composition.

—Evaluation Criteria—

A: The change of the D95 particle size and the viscosity, and sedimentation of pigment particle were not observed.

B: The change of the D95 particle size and the viscosity, and sedimentation of pigment particle were observed slightly, but there were no practical problems.

C: The change of the D95 particle size and the viscosity, and sedimentation of pigment particle were observed, and there were practical problems.

D: The change of the D95 particle size and the viscosity, and sedimentation of pigment particle were observed.

(1) Measurement of D95 Particle Size

Nanotrac particle size distribution analyzer UPA-EX150 (produced by NIKKISO Co., Ltd.,) was used, and D95 particle size of the obtained pigment dispersed material was measured by a dynamic light scattering method. Herein, D95 particle size represents a particle size of 95% of cumulation of the particles from small particle size, in cumulative number distribution of particle size.

<Measuring Conditions>

10 mL of an ion exchange water was added to 10 μL of dispersed material to prepare a solution for measurement and D95 particle size was measured at 25° C. using the solution.

(2) Measurement of Viscosity

The viscosity of the obtained pigment dispersed material was measured at 25° C., using a TV-22 type viscometer (produced by TOKI SANGYO CO., LTD.).

(3) Evaluation of Sedimentation Properties 13 mL of the obtained pigment material was left in a sealing state in a burette at 23° C. for 7 days. Then, an upper layer of 3 mL and a lower layer of 10 mL were taken respectively, and a number of coarse particles having particle size of 5 μm or more and spectral absorption measurement were carried out with respect to liquid of the upper layer and the lower layer. The number of coarse particles having particle size of 5 μm or more was measured by a flow-type particle image analyzer FPIA 3000 (produced by Sysmex Corporation). Further, the spectral absorption measurement was carried out by SHIMADZU UV-2450 (produced by SHIMADZU Corporation), using a sample where liquid of the upper layer and the lower layer was diluted 10,000 times. The sedimentation properties were confirmed depending on whether coarse particles having 5 μm or more was present. In a case in which coarse particles having 5 μm or more were not present and difference of spectral absorption of the upper layer and the lower layer is 10 or less, it was evaluated that sedimentation was not observed.

<Image Forming and Evaluation 2>

—Image Forming—

The aqueous ink composition obtained above is sequentially equipped with an ink jet recording apparatus PX-G930 (produced by Seiko Epson Corporation), a solid image and characters were printed on FX-L (produced by Fuji Xerox Co., Ltd.) prepared as a recording medium. Then, irradiation was carried out during transfer under light beam of an iron-doped ultraviolet lamp (output 120 W/cm$^2$) for 1 second, and the portion of the solid image and the portion of the characters were cured to obtain a sample printed matter. With respect to the obtained sample printed matter, the following evaluation was carried out. The result is shown in Table 1 to 2.

—Evaluation 2—

(1) Glossiness

With respect to the portion of the solid image in the sample printed matter obtained above, the presence of gloss was observed with the eye, and evaluation was determined based on the following evaluation criteria.

<Evaluation Criteria>
A: There was gloss.
B: There was some gloss.
C: There was little gloss.
D: There was no gloss.

(2) Adhesiveness

A cutting of grid was put in the obtained sample printed paper, and was covered with tape, and then the tape was peeled, the ratio of the portion remained on the recording medium by adhesion was observed, and was evaluated with the following evaluation criteria.

<Evaluation Criteria>
A: Residual ratio of 80% or more
B: Residual ratio of from 70% to less than 80%
C: Residual ratio of from 60% to less than 70%
D: Residual ratio of less than 60%

(3) Water Resistance

Water droplet was added dropwise with a dropper on the portion of the solid image and the portion of the characters in the obtained sample printed matter, and a paper was inclined to investigate the occurrence of bleeding, and evaluation was determined based on the following evaluation criteria.

<Evaluation Criteria>
A: Bleeding to non-printed portion was not observed.
B: Bleeding to non-printed portion occurred in a surrounding the portion of the solid image and the characters.
C: Bleeding to non-printed portion was pronounced, and characters became blurred.
D: The characters were not clear, and a flowed portion of white paper was stained.

TABLE 1

| | Pigment | | | | | | | | Evaluation of printed matter | | |
| --- | --- | --- | --- | --- | --- | --- | --- | --- | --- | --- | --- |
| | Aqueous ink | dispersed material | | Mw | $M_w/M_n$ | Acid value [mg KOH/g] | Pigment | Dispersion stability | Glossiness | Adhesiveness | Water resistance |
| The invention | F-1 | E-1 | B-1 | 38,000 | 2.44 | 65.2 | PR-122 | B | B | A | A |
| The invention | F-2 | E-2 | B-2 | 40,000 | 2.47 | 65.2 | PR-122 | A | A | A | A |
| The invention | F-3 | E-3 | B-3 | 40,000 | 2.49 | 65.2 | PR-122 | A | A | A | A |
| The invention | F-4 | E-4 | B-4 | 40,500 | 2.53 | 65.2 | PR-122 | A | A | A | A |
| The invention | F-5 | E-5 | B-4 | 40,500 | 2.53 | 65.2 | PB-15:3 | A | A | A | A |
| The invention | F-6 | E-6 | B-4 | 40,500 | 2.53 | 65.2 | PY-74 | A | A | A | A |
| The invention | F-7 | E-7 | B-4 | 40,500 | 2.53 | 65.2 | CB | A | A | A | A |
| The invention | F-8 | E-8 | B-5 | 41,000 | 2.53 | 65.2 | PR-122 | A | A | A | A |
| The invention | F-9 | E-9 | B-6 | 42,000 | 2.53 | 32.6 | PR-122 | B | B | A | A |
| The invention | F-10 | E-10 | B-7 | 42,000 | 2.53 | 52.1 | PR-122 | A | A | A | A |
| The invention | F-11 | E-11 | B-8 | 41,500 | 2.57 | 78.2 | PR-122 | A | A | A | A |
| The invention | F-12 | E-12 | B-9 | 40,300 | 2.65 | 97.8 | PR-122 | A | A | A | A |
| The invention | F-13 | E-13 | B-10 | 40,500 | 2.63 | 117.3 | PR-122 | A | A | A | A |
| The invention | F-14 | E-14 | B-11 | 42,500 | 2.61 | 130.4 | PR-122 | A | A | A | A |
| The invention | F-15 | E-15 | B-12 | 43,500 | 2.64 | 162.9 | PR-122 | A | B | A | A |
| The invention | F-16 | E-16 | B-13 | 22,000 | 2.65 | 65.2 | PR-122 | B | B | A | A |
| The invention | F-17 | E-17 | B-14 | 32,000 | 2.67 | 65.2 | PR-122 | A | A | A | A |
| The invention | F-18 | E-18 | B-15 | 50,600 | 2.01 | 65.2 | PR-122 | A | A | A | A |
| The invention | F-19 | E-19 | B-16 | 60,600 | 2.21 | 65.2 | PR-122 | A | A | A | A |
| The invention | F-20 | E-20 | B-17 | 81,000 | 2.69 | 65.2 | PR-122 | A | A | A | A |

TABLE 2

| | Pigment | | | | | | | | Evaluation of printed matter | | |
| --- | --- | --- | --- | --- | --- | --- | --- | --- | --- | --- | --- |
| | Aqueous ink | dispersed material | | Mw | $M_w/M_n$ | Acid value [mg KOH/g] | Pigment | Dispersion stability | Glossiness | Adhesiveness | Water resistance |
| The invention | F-21 | E-21 | B-18 | 99,600 | 2.72 | 65.2 | PR-122 | A | A | A | A |
| The invention | F-22 | E-22 | B-19 | 40,000 | 2.33 | 65.2 | PR-122 | A | B | A | A |
| The invention | F-23 | E-23 | B-20 | 40,500 | 2.35 | 65.2 | PR-122 | A | B | A | A |
| The invention | F-24 | E-24 | B-22 | 43,200 | 2.45 | 65.2 | PR-122 | A | B | A | A |
| The invention | F-25 | E-25 | B-24 | 41,600 | 2.35 | 65.2 | PR-122 | A | B | A | A |
| The invention | F-26 | E-26 | B-35 | 42,000 | 2.29 | 78.2 | PR-122 | A | B | A | A |
| The invention | F-27 | E-27 | B-43 | 28,000 | 2.25 | 65.2 | PR-122 | A | B | A | A |
| The invention | F-28 | E-28 | B-45 | 47,000 | 2.68 | 65.2 | PR-122 | A | B | A | A |
| The invention | F-29 | E-29 | B-47 | 45,000 | 2.61 | 65.2 | PR-122 | A | B | A | A |
| The invention | F-30 | E-30 | B-49 | 44,000 | 2.52 | 65.2 | PR-122 | A | B | A | A |
| The invention | F-31 | E-31 | B-51 | 40,000 | 2.42 | 65.2 | PR-122 | A | B | A | A |
| Comparative Example | F-32 | E-32 | D-1 | 36,000 | 2.66 | 65.2 | PR-122 | B | B | D | D |
| Comparative Example | F-33 | E-33 | D-2 | 16,200 | 2.32 | 187.0 | PR-122 | D | D | B | B |

As shown in Table 1 to 2, in the invention, the dispersion stability was excellent, and an image which the glossiness, the adhesiveness, and the water resistance of the formed image portion were excellent can be formed. On the other hand, in the Comparative Examples, good dispersion stability was not obtained, the glossiness, the adhesiveness, and the water resistance of the image portion were not satisfied.

According to a first aspect of the invention, there may be provided an aqueous ink composition which has dispersion stability and dischargeability required as an ink and forms a cured film which has an excellent glossiness, an excellent adhesiveness, and an excellent water resistance by curing (preferably curing by irradiation of light). Further, according to a second aspect of the invention, there may be provided an image forming method which forms an image which has an excellent glossiness, an excellent adhesiveness, and an excellent water resistance.

Hereinafter exemplary embodiments of the invention related to the first aspect and the second aspect will be described. However, the invention is not limited to the following embodiments.

<1> An aqueous ink composition comprising (A) a colorant, (B) a polymer including a hydrophobic structural unit (a) represented by Formula (1) below, (C) a polymerization initiator, (D) a polymerizable compound including an ethylenically unsaturated bond, and (E) water,

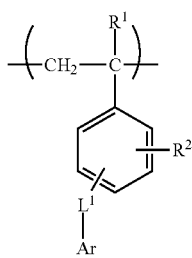

Formula (1)

In the Formula (1), $R^1$ represents a hydrogen atom or a methyl group, $R^2$ represents a hydrogen atom, an alkyl group, an alkyloxy group, an acyl group, or a halogen atom. $L^1$ represents a single bond, or a divalent linkage group including at least one selected from a linkage group consisting of an alkylene group having from 1 to 12 carbon atoms, an alkenylene group having from 2 to 12 carbon atoms, an alkyl ether group having from 2 to 6 carbon atoms, —CONR$^3$—, and —COO—. $R^3$ represents a hydrogen atom or an alkyl group having from 1 to 6 carbon atoms. Ar represents a monovalent group derived from a condensed-ring type aromatic compound having 8 or more carbon atoms, a monovalent group derived from a heterocyclic compound in which aromatic rings are condensed, or a monovalent group derived from a compound in which two or more benzene rings are connected.

<2> The aqueous ink composition as described in <1>, wherein the polymer (B) further includes a hydrophilic structural unit (b) of less than 25% by mass with respect to a total mass of the polymer (B).

<3> The aqueous ink composition as described in <1> or <2>, wherein the polymer (B) further includes a hydrophobic structural unit (c) derived from an alkyl ester of acrylic acid or methacrylic acid, an alkyl group of the alkyl ester having from 1 to 6 carbon atoms.

<4> The aqueous ink composition as described in any one of <1> to <3>, wherein, in the Formula (1), $L^1$ represents a single bond or an alkylene group having from 1 to 6 carbon atoms.

<5> The aqueous ink composition according to any one of <1> to <4>, wherein, in the Formula (1), $R^1$ represents a hydrogen atom.

<6> The aqueous ink composition as described in any one of <2> to <5>, wherein the hydrophilic structural unit (b) includes a carboxyl group.

<7> The aqueous ink composition as described in any one of <2> to <6>, which, as the hydrophilic structural unit (b), includes a structural unit derived from at least one of acrylic acid or methacrylic acid.

<8> The aqueous ink composition as described in any one of <1> to <7>, wherein, in the Formula (1), Ar represents a monovalent group derived from acridone, naphthalene, biphenyl, triphenyl methane, phthalimide, fluorene, anthracene, phenanthrene, diphenyl methane, naphthalimide, or carbazole.

<9> The aqueous ink composition as described in any one of <3> to <8>, wherein the hydrophobic structural unit (c) includes a structural unit derived from at least one selected from the group consisting of methyl acrylate, methyl methacrylate, ethyl acrylate, and ethyl methacrylate.

<10> The aqueous ink composition as described in any one of <1> to <9>, wherein the colorant (A) is a pigment.

<11> The aqueous ink composition as described in any one of <1> to <10>, wherein, the hydrophobic structural unit (a) represented by the Formula (1) is a structural unit in which $R^1$ and $R^2$ each independently represents a hydrogen atom; $L^1$ represents a divalent linkage group including an alkylene group having from 1 to 6 carbon atoms; and Ar represents a monovalent group derived from naphthalene, biphenyl, phthalimide, naphthalimide, or acridone.

<12> The aqueous ink composition as described in any one of <1> to <11>, wherein the polymerizable compound (D) includes either a poly(oxyethylene) chain or a poly(oxypropylene) chain, in a range of from 1 to 10 in a molecule.

<13> The aqueous ink composition as described in any one of <1> to <12>, which includes, as the polymerizable compound (D), monoacrylate and either a multifunctional acrylate monomer or a multifunctional acrylate oligomer, the monomer or oligomer having a molecular weight of 400 or more.

<14> The aqueous ink composition as described in any one of <1> to <13>, which is used in recording by an ink-jet method.

<15> An image forming method including;
providing the aqueous ink composition as described in any one of <1> to <13> on a recording medium by an ink-jet method; and
irradiating the aqueous ink composition provided on the recording medium with active radiation rays.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. An aqueous ink composition comprising (A) a colorant, (B) a polymer including a hydrophobic structural unit (a) represented by Formula (1) below, (C) a polymerization initiator, (D) a polymerizable compound including an ethylenically unsaturated bond, and (E) water,

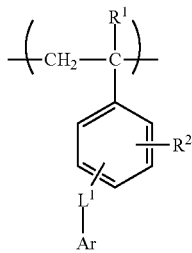

Formula (1)

wherein, in Formula 1, $R^1$ represents a hydrogen atom or a methyl group; $R^2$ represents a hydrogen atom, an alkyl group, an alkyloxy group, an acyl group, or a halogen atom; $L^1$ represents a single bond, or a divalent linkage group including at least one selected from a linkage group consisting of an alkylene group having from 1 to 12 carbon atoms, an alkenylene group having from 2 to 12 carbon atoms, an alkyl ether group having from 2 to 6 carbon atoms, —CONR$^3$—, and —COO—; $R^3$ represents a hydrogen atom or an alkyl group having from 1 to 6 carbon atoms; and Ar represents a monovalent group derived from a condensed-ring type aromatic compound having 8 or more carbon atoms, a monovalent group derived from a heterocyclic compound in which aromatic rings are condensed, or a monovalent group derived from a compound in which two or more benzene rings are connected.

2. The aqueous ink composition according to claim 1, wherein the polymer (B) further includes a hydrophilic structural unit (b) of less than 25% by mass with respect to a total mass of the polymer (B).

3. The aqueous ink composition according to claim 2, wherein the hydrophilic structural unit (b) includes a carboxyl group.

4. The aqueous ink composition according to claim 2, which, as the hydrophilic structural unit (b), includes a structural unit derived from at least one of acrylic acid or methacrylic acid.

5. The aqueous ink composition according to claim 1, wherein the polymer (B) further includes a hydrophobic structural unit (c) derived from an alkyl ester of acrylic acid or methacrylic acid, an alkyl group of the alkyl ester having from 1 to 6 carbon atoms.

6. The aqueous ink composition according to claim 5, wherein the hydrophobic structural unit (c) includes a structural unit derived from at least one selected from the group consisting of methyl acrylate, methyl methacrylate, ethyl acrylate, and ethyl methacrylate.

7. The aqueous ink composition according to claim 1, wherein, in the Formula (1), $L^1$ represents a single bond or an alkylene group having from 1 to 6 carbon atoms.

8. The aqueous ink composition according to claim 1, wherein, in the Formula (1), $R^1$ represents a hydrogen atom.

9. The aqueous ink composition according to claim 1, wherein, in the Formula (1), Ar represents a monovalent group derived from acridone, naphthalene, biphenyl, triphenyl methane, phthalimide, fluorene, anthracene, phenanthrene, diphenyl methane, naphthalimide, or carbazole.

10. The aqueous ink composition according to claim 1, wherein the colorant (A) is a pigment.

11. The aqueous ink composition according to claim 1, wherein, the hydrophobic structural unit (a) represented by the Formula (1) is a structural unit in which $R^1$ and $R^2$ each independently represents a hydrogen atom; $L^1$ represents a divalent linkage group including an alkylene group having from 1 to 6 carbon atoms; and Ar represents a monovalent group derived from naphthalene, biphenyl, phthalimide, naphthalimide, or acridone.

12. The aqueous ink composition according to claim 1, wherein the polymerizable compound (D) includes either a poly(oxyethylene) chain or a poly(oxypropylene) chain, in a range of from 1 to 10 in a molecule.

13. The aqueous ink composition according to claim 1, which includes, as the polymerizable compound (D), monoacrylate and either a multifunctional acrylate monomer or a multifunctional acrylate oligomer, the monomer or oligomer having a molecular weight of 400 or more.

14. The aqueous ink composition according to claim 1, which is used in recording by an ink jet method.

15. An image forming method comprising;
providing the aqueous ink composition according to claim 1 on a recording medium by an ink jet method; and
irradiating the aqueous ink composition provided on the recording medium with active radiation rays.

* * * * *